United States Patent
Kita et al.

(10) Patent No.: US 8,427,911 B2
(45) Date of Patent: Apr. 23, 2013

(54) OPTICAL PICKUP

(75) Inventors: Hiromi Kita, Hiratsuka (JP); Tomoto Kawamura, Yokohama (JP); Toshiteru Nakamura, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 12/956,155

(22) Filed: Nov. 30, 2010

(65) Prior Publication Data

US 2011/0182159 A1 Jul. 28, 2011

(30) Foreign Application Priority Data

Jan. 25, 2010 (JP) ................... 2010-012753

(51) Int. Cl.
- *G11B 7/00* (2006.01)
- *G11B 5/58* (2006.01)
- *G11B 20/18* (2006.01)
- *G11B 7/135* (2006.01)

(52) U.S. Cl.
USPC .............. 369/44.23; 369/109.01; 369/112.03; 369/124.12; 369/53.23; 369/53.27

(58) Field of Classification Search .............. 369/44.14, 369/44.23, 44.41, 53.22, 53.27, 53.35, 109.01, 369/109.02, 110.03, 112.03, 112.04, 112.07, 369/112.12, 124.12
See application file for complete search history.

(56) References Cited

U.S. PATENT DOCUMENTS

| | | | |
|---|---|---|---|
| 2002/0012302 A1* | 1/2002 | Arikawa et al. | 369/53.2 |
| 2004/0095860 A1* | 5/2004 | Ariyoshi et al. | 369/44.32 |
| 2005/0199778 A1 | 9/2005 | Kadowaki et al. | |
| 2008/0094948 A1* | 4/2008 | Kamisada et al. | 369/44.11 |
| 2008/0137516 A1* | 6/2008 | Hamaguchi et al. | 369/112.07 |
| 2009/0086609 A1* | 4/2009 | Miyazaki | 369/112.05 |

FOREIGN PATENT DOCUMENTS

JP 2004-281026 10/2004

* cited by examiner

*Primary Examiner* — Aneeta Yodichkas

(74) *Attorney, Agent, or Firm* — Antonelli, Terry, Stout & Kraus, LLP.

(57) ABSTRACT

An optical pickup includes a light source, an objective lens, a diffraction grating that divides an optical beam reflected from a predetermined information layer, into a plurality of optical beams, and a detector having a plurality of photo-receivers to receive a plurality of optical beams. The diffraction grating has a predetermined region for dividing from a signal light beam a region including a central portion of a spot which the signal light beam will form on the diffraction grating. A distance from a central section of the detector to that of a spot center photo-receiver on the detector, the spot center photo-receiver being provided to receive the optical beams formed by division in a predetermined region of the diffraction grating, is equal to or greater than a spot radius of the unwanted light beams entering the predetermined region of the diffraction grating, on the detector.

16 Claims, 11 Drawing Sheets

OPTICAL PICKUP

CLAIM OF PRIORITY

The present application claims priority from Japanese patent application serial No JP 2010-012753, filed on Jan. 25, 2010, the content of which is hereby incorporated by reference into this application.

BACKGROUND OF THE INVENTION (1) Field of the Invention

The present invention relates to an optical pickup that records information on or reproduces information from optical discs.

(2) Description of the Related Art

A technique concerned with the present invention is described in Japanese laid-open patent application publication No. JP-A-2004-281026 that discloses an optical pickup.

SUMMARY OF THE INVENTION

Optical discs are one of the media drawing a great deal of attention as long-storage media in terms of cost reduction, the reliability of data storage, and the like. Optical discs with two information layers, such as digital versatile discs (DVDs) and Blu-ray discs (BDs), have heretofore been standardized for increased capacity. Currently, recording and reproducing information with an optical disc having three or more information layers is being considered as a technique for obtaining an even larger capacity. Optical discs with two information layers or with three or more information layers are called "multilayered optical discs".

In an optical disc with eccentricity or a runout on face, as the optical disc spins, mismatching will occur between the reproduction position on the disc and the focal position of the optical beam. For this reason, the focal position of the optical beam is controlled in radial and perpendicular directions of the disc to match the desired or intended reproducing position. Radial control of the disc is referred to as tracking control, and vertical control of the disc as focus control.

The differential push-pull (DPP) method or the differential phase detection (DPD) method is generally used to generate a tracking control signal, or tracking error signal (TES), for tracking control. JP-A-2004-281026 describes a method of detecting TES by dividing a disc-reflected optical beam into a region called the push-pull region, and other regions, via a diffraction grating. The method of TES detection, based on JP-A-2004-281026, is hereinafter called the single-beam differential push-pull (DPP) method.

Meanwhile, the astigmatic method or the knife-edge method is generally used to generate a focusing error signal (FES) for focus control. These control signals are generated through photoelectric conversion by detector detection of the optical beam reflected from a predetermined information layer from which information is to be reproduced on the optical disc. This beam is hereinafter referred to as the signal light beam.

When information present on a multilayered disc is reproduced, an unwanted optical beam reflected from an information layer different from that from which the information is to be reproduced will occur (this beam is hereinafter referred to as the unwanted light beam). Incidence of the unwanted light beam upon photo-receivers of the detector will cause TES and/or FES noise, resulting in unstable control. For information reproduction, therefore, multilayered discs need to be constructed to prevent the unwanted light beam from entering the photo-receivers at which TES and FES are generated.

The configuration described in JP-A-2004-281026 uses the single-beam DPP method to generate TES, and the astigmatic method to generate FES, and prevents the unwanted light beam from entering TES-generating photo-receivers during reproduction from the optical disc including two information layers. For FES, however, no consideration is given to entry of the unwanted light beam. In addition, the device with the diffraction grating combined with a detection lens has a number of constituent elements and is hence expensive. Furthermore, assembly steps correspondingly increase, which reduces productivity. Besides, no description is given of recording on or reproduction from an optical disc having three or more information layers.

An object of the present invention is to provide an inexpensive optical pickup adapted to conduct stable tracking control and focus control by eliminating any impacts of an unwanted light beam from TES and FES during multilayered disc recording or reproduction.

The above object can be attained by adopting any one of the configurations described as an example in claims.

According to the present invention, an optical pickup adapted to conduct stable tracking control and focus control during multilayered disc recording or reproduction can be provided.

BRIEF DESCRIPTION OF THE DRAWINGS

These and other features, objects and advantages of the present invention will become more apparent from the following description when taken in conjunction with the accompanying drawings, wherein.

DETAILED DESCRIPTION OF THE EMBODIMENTS

Hereunder, embodiments of the present invention will be described in detail in accordance with the accompanying drawings. The description, however, does not limit the invention.

(First Embodiment)

Figure 1:
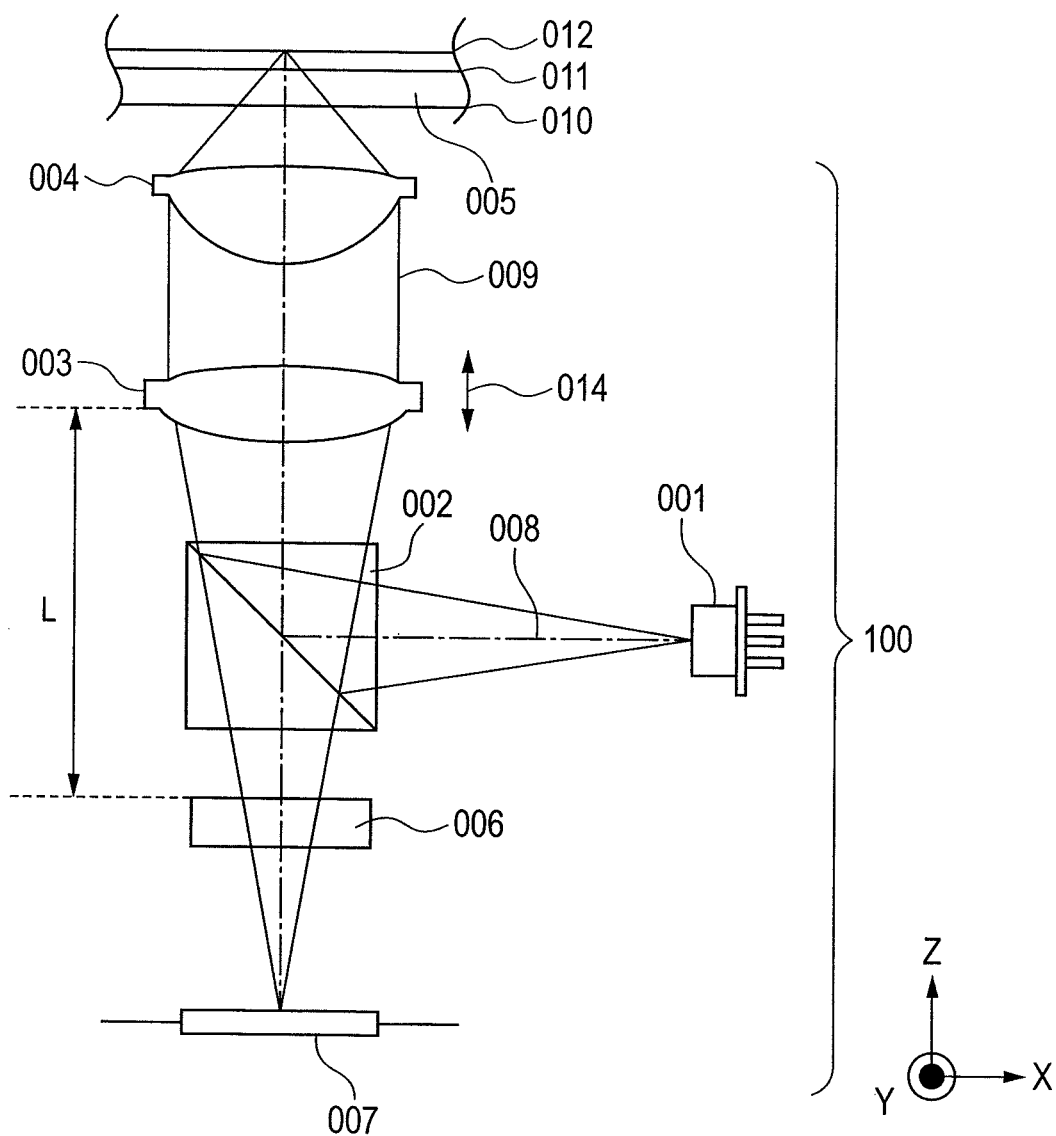
FIG. 1 is a schematic diagram showing a configuration of an optical pickup 100 according to a first embodiment.

An optical pickup according to a first embodiment of the present invention is described in detail below. An optical pickup adapted for recording information on or reproducing information from a double-layered disc of current Blu-ray disc (BD) standards is described first. FIG. 1 is a schematic diagram showing a configuration of the optical pickup 100 according to the first embodiment. In the figure, the X-direction is equivalent to the radial direction of the optical disc, the Z-direction to the vertical direction thereof, and the Y-direction to the direction parallel to tracks of the optical disc.

An optical beam is emitted as divergent light from a light source 001. Recording information on or reproducing information from a BD generally uses a semiconductor laser that emits optical beams of 405±10 nm in wavelength. The present embodiment assumes that the light source 001 emits optical beams of 405±10 nm in wavelength. A dotted-and-dashed line 008 denotes a central optical path of the optical beam emitted from the light source 001, and a solid line 009 denotes an outer edge of the optical beam path. The optical beam emitted from the light source 001 enters a light-branching element 002. The light-branching element 002 has a function that causes only a predetermined amount of light of the incident optical beam to pass through and reflects a remaining amount of light. A polarizing prism, for example, can be used to realize the light-branching element 002.

A change in the amount of light from the light source during reproduction deteriorates a reproduction signal. Optical pickups usually use a detector to measure the amount of light from the light source and provide feedback control for a fixed amount of light, or fixed luminous intensity. The detector for feedback control is referred to as a front monitor. Although not shown, an optical beam that has passed through the light-branching element 002 may be used for the front monitor. The beam of light that has been reflected from the light-branching element 002 enters a collimating lens 003, where the beam is then transformed into a nearly parallel beam of light.

The optical beam that has passed through the collimating lens 003 is admitted in converged form into a predetermined, internal information layer of the double-layered disc 005 by an objective lens 004. An objective lens's numerical aperture (NA) of 0.85 is usually used to reproduce information from a BD. The objective lens 004 in the present embodiment also assumes an NA of 0.85 to reproduce information from the BD. The objective lens 004 is mounted in or on an actuator (not shown) and can be driven in the radial direction of the optical disc (i.e., the X-direction in FIG. 1) and in the vertical direction thereof (i.e., the Z-direction in FIG. 1). Radial driving is used for tracking control and lens displacement, and vertical driving is used for focus control. In general, lens displacement refers to driving the objective lens in the radial direction of the optical disc.

The double-layered disc 005 has a surface 010, an information layer 011, and an information layer 012. Double-layered disc standards provide for a space of 100 µm from the surface to the information layer that is more remote therefrom, and a space of 25 µm between the two information layers. The present embodiment also assumes a 100-µm space between the surface and the information layer 012, and a 25-µm space between the information layers 011 and 012. FIG. 1 assumes reproduction from the information layer 012, upon which the optical beam is converged. The optical beam reflected from the information layer 012 within the double-layered optical disc 005 travels through the objective lens 004, the collimating lens 003, and the light-branching element 002, in that order, and then enters a diffraction grating 006.

The diffraction grating 006 is formed from a plurality of regions, and the optical beam that has entered the grating is divided into +1st-order light and −1st-order light (neither shown) for each region. The regions of the diffraction grating 006 will be described later herein. The optical beam, after being divided by the diffraction grating 006, enters predetermined photo-receivers of a detector 007. The detector 007 has a plurality of photo-receivers, and outputs an electrical signal in accordance with the luminous intensity of the optical beam which has entered the photo-receiver. The detector also generates TES based on the single-beam DPP and DPD schemes, FES based on the knife-edge scheme, and a reproduction signal (RF signal). The photo-receivers inside the detector 007 will be described later herein. The detector is usually disposed at a focal position of the collimating lens. In FIG. 1, the detector 007 is also disposed at the position where is converged the optical beam that was passed through the diffraction grating 006, not divided thereby.

As described above, the optical pickup 100 includes the light source 001, the light-branching element 002, the collimating lens 003, the objective lens 004, the diffraction grating 006, and the detector 007.

It can be seen from FIG. 1 that a detection lens is not provided in the optical pickup 100 of the present embodiment. Detection lenses are usually used for FES detection in the astigmatic scheme. The optical pickup 100 of the present embodiment employs the knife-edge scheme to generate FES, and is thus devised to do without a detection lens. The absence of a detection lens leads to reduction in the number of components required, and thus enables low-cost production of the optical pickup 100. Assembly steps are also reduced, which is likely to improve productivity. Hereinafter, an optical path on which incident light travels from the light source 001 to the double-layered disc 005 will be referred to as the inbound path, and an optical path on which exit light travels from the double-layered disc 005 to the detector 007 will be referred to as the outbound path.

In addition, of the optical beam that has been emitted from the light source, the optical beam components reflected from the information layer being used for information reproduction will be referred to as the signal light beam. For example, in FIG. 1, the optical beam reflected from the information layer 012 is the signal light beam. Conversely, the optical beam components reflected from the information layer different from that being used for information reproduction will be referred to as the unwanted light beam. For example, although not shown in FIG. 1, the optical beam reflected from the information layer 011 is the unwanted light beam.

In an optical disc with a runout on face, a shift in position in the vertical direction of the disc (i.e., the Z-direction in FIG. 1) occurs between the focal position of the optical beam and the information layer from which information is to be reproduced. This state is generally referred to as defocus. Defocus causes no convergence of the optical beam upon the detector, forming a blurry spot. In the present embodiment, when the optical disc moves close to the objective lens, this state is referred to as in-focus, and conversely when the disc moves away from the lens, this operation is referred to as out-of-focus.

For BDs, since the NA of the objective lens is large, if the space from the surface to the desired information layer differs from a required value, the optical beam converged upon the information layer will suffer from significant spherical aberration. An ordinary optical pickup, therefore, has a mechanism that corrects spherical aberration by driving a collimating lens in the direction of an optical axis and controlling a divergent state and focused state of the beam. The present embodiment also assumes that the optical pickup 100 has a mechanism that corrects spherical aberration by driving the collimating lens 003 in a direction parallel to an optical axis (i.e., a direction of an arrow 014 in FIG. 1). Use of a deformable mirror or a concentric liquid-crystal element makes spherical aberration correctible without driving the collimating lens. A deformable mirror may be disposed in immediate front of the objective lens 004 or a concentric liquid-crystal element may be disposed near the collimating lens 003.

In the present embodiment, the diffraction grating 006 is disposed between the light-branching element 002 and the detector 007, as shown in FIG. 1, to implement less expensive fabrication of the diffraction grating having significant cost impacts. Disposing the diffraction grating 006 between the collimating lens 003 and the objective lens 004 is undesirable since, if the diffraction grating 006 is disposed between the collimating lens 003 and the objective lens 004, driving the collimating lens 003 will change the spot position of the signal light beam on the detector 007, deteriorating FES, TES, and the RF signal.

The diffraction grating 006 is desirably disposed between the collimating lens 003 and the light-branching element 002 or between the light-branching element 002 and the detector 007. A region between the collimating lens 003 and the light-branching element 002 is where the inbound path and the outbound path are used in common. To dispose the diffraction grating 006 on a common optical path in this way is called "inbound/outbound path layout". Realizing the inbound/outbound path layout requires forming a diffraction grating that functions to make an inbound optical beam pass through and diffract only an outbound optical beam. Such a diffraction grating is achievable with a polarizing diffraction grating, but requires a complex fabrication process and is generally expensive.

Additionally, an inbound optical beam in an actual device cannot completely pass through a polarizing diffraction grating and is slightly diffracted, and incidence of the diffracted optical beam upon a detector causes a serious problem. Such a diffracted optical beam is called "inbound stray light". The optical path between the light-branching element 002 and the detector 007, on the other hand, operates only as the outbound path. To dispose the diffraction grating 006 in this form on the path used only as the outbound path, is called "outbound path layout".

In the outbound path layout pattern, since distinction between the inbound and outbound beams is unnecessary, a non-polarizing diffraction grating can be used. A non-polarizing diffraction grating is far less expensive than a polarizing diffraction grating. The outbound path layout, compared with the inbound/outbound path layout, provides a reduction in spot size of the signal light on the diffraction grating, thus enabling the diffraction grating 006 to be downsized in outline. Briefly, outbound-path disposition of the diffraction grating 006, compared with its inbound/outbound-path disposition, dimensionally reduces the outline of the grating and hence enables even less expensive fabrication thereof. In addition, since the outbound path layout permits no inbound beam to pass through, the outbound path layout is effective in that the inbound stray light as seen in the inbound path layout cannot exist.

Let a distance between the collimating lens 003 and the diffraction grating 006 be L as shown in FIG. 1. As a spacing between the light source 001 and the light-branching element 002 and a spacing between the light-branching element 002 and the detector 007 increase, sensitivity due to component deviations usually increases too much and reliability of the optical pickup deteriorates. This occurs if the distance L is reduced.

Conversely, increasing the distance L makes the spot size too smaller on the diffraction grating 006, rendering its pitch too fine. This makes the diffraction grating difficult to manufacture, leading to increased costs. In particular, if the distance L is too long, this makes the manufacture itself of the diffraction grating impossible. As can be seen from these facts, the distance L has a relationship of trade-offs with respect to costs and the reliability of the optical pickup. Thus, it is recommended that the distance L be between ½ and ¾ of the focal distance of the collimating lens.

Figure 2:
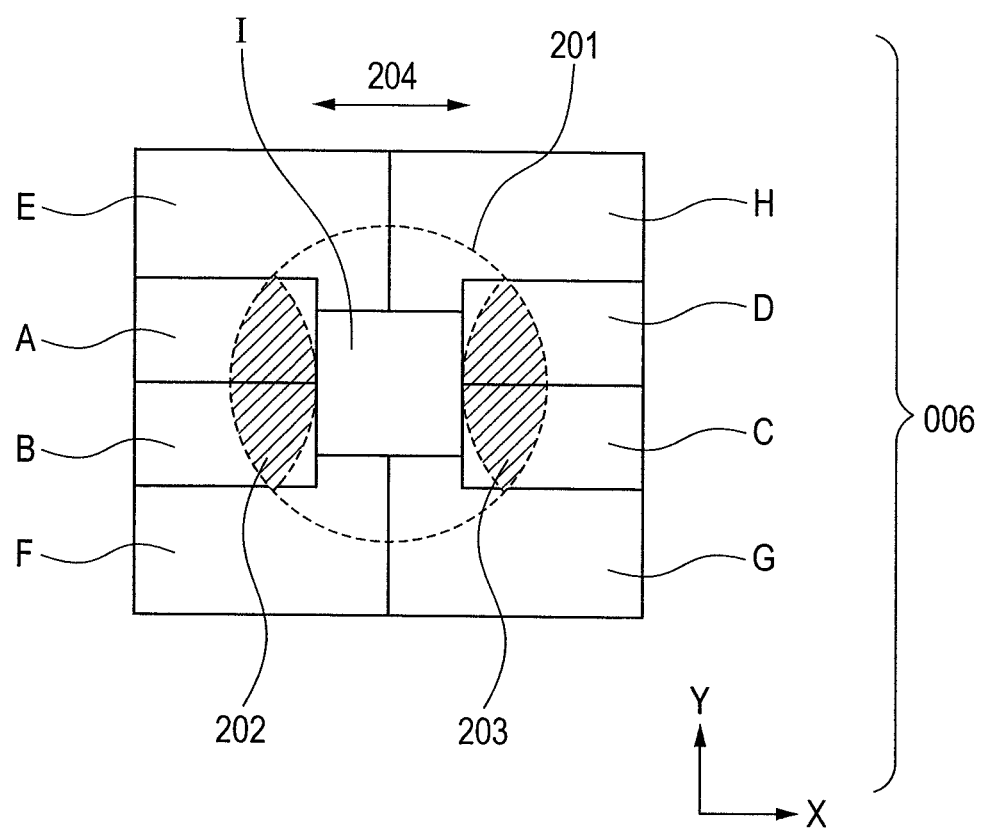
FIG. 2 is a diagram illustrating a diffraction grating 006 of the first embodiment.

Next, the divided regions of the diffraction grating 006 are described below with reference to FIG. 2. FIG. 2 shows the diffraction grating 006 as viewed from the detector 007. The horizontal direction in FIG. 2 is equivalent to the X-direction in FIG. 1, and the vertical direction to the Y-direction. The diffraction grating 006 is divided into nine regions, namely, A, B, C, D, E, F, G, H, and I, as shown in FIG. 2. The signal light beam that has entered the diffraction grating 006 is divided into +1st-order light and −1st-order light. The regions A, B, C, D, E, F, G, H assume a blazed type of diffraction grating that generates a luminous intensity ratio of 4:1 between the +1st-order light and the −1st-order light. In the present embodiment, the RF signal is generated from the +1st-order light. If the +1st-order light is smaller in luminous intensity, this deteriorates signal-to-noise (S/N) characteristics. For this reason, the luminous intensity of the +1st-order light is prioritized to be greater than that of the −1st-order light. However, for example if the S/N characteristics can be satisfied, the luminous intensity ratio between the +1st-order light and the −1st-order light can be 5:1 or 3:1.

The region I assumes a rectangular type of diffraction grating formed to obtain a luminous intensity ratio of 1:1 between the +1st-order light and the −1st-order light. The +1st-order signal light and −1st-order signal light that have entered the region I are both used to generate the RF signal. The diffraction grating 006 can be of a blazed-type structure that yields a 1:2 or 1:0 luminous intensity ratio between the +1st-order light and the −1st-order light. The rectangular type has advantages over the blazed type. For example, the former is simpler in fabrication process, and can be made narrower in pitch, than the latter. Therefore, the present embodiment employs the rectangular type of diffraction grating for the region I.

A broken-line circle 201 denotes the outermost edge defined by the signal light beam incident upon the diffraction grating 006. Shaded sections 202 and 203 denote push-pull regions. An arrow 204 signifies lens-shifting directions. As shown, the push-pull regions occur in the lens-shifting directions. Since the present embodiment assumes single-beam DPP, the signal light beam needs to be divided into push-pull regions and other regions. As shown, the diffraction grating 006 is divided into the regions A, B, C, D that are the push-pull regions, and the regions E, F, G, H, I that are the other regions.

A push-pull signal is generated from the regions A, B, C, D, inclusive of the push-pull regions shown in FIG. 2, through predetermined computation. A lens error signal associated with lens displacement is generated from the regions E, F, G, H, exclusive of the push-pull regions, through predetermined computation. Generation of TES in the single-beam DPP scheme is based on a differential output value between the push-pull signal and the lens-shifting error signal.

Figure 3:
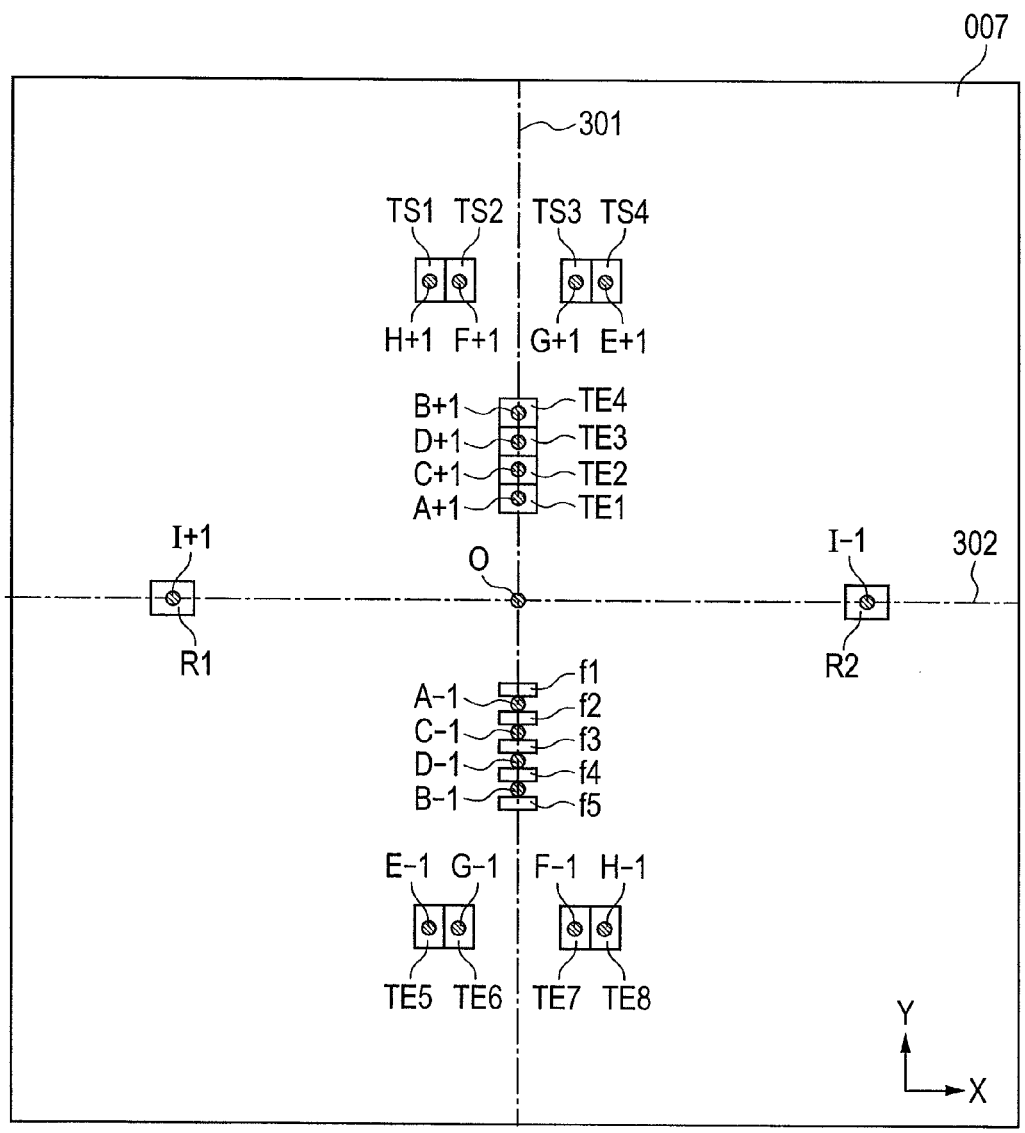
FIG. 3 is a diagram illustrating a detector 007 of the first embodiment.

Next, the detector 007 is described below with reference to FIG. 3. FIG. 3 shows the detector 007 as viewed from a minus Z-direction, and assumes that the signal light beam is focused on an information layer. In FIG. 3, the horizontal direction is defined as an X-direction, and the vertical direction as a Y-direction. A central point of the detector 007 is denoted as O, which is equivalent to a position upon which a signal light beam that has been passed through the diffraction grating 006, not divided thereby, is converged. In FIG. 3, a dashed-and-dotted line passing through the detector central point O, in the X-direction, is shown as an X-axis 302, and a dashed-and-dotted line passing through the detector central point O, in the Y-direction, is shown as a Y-axis 301.

The detector 007 internally has 19 photo-receivers, namely, TE 1 to TE 8, TS 1 to TS 4, R1 and R2, and f1 to f5. Layout of these photo-receivers is as shown in FIG. 3. The layout of the photo-receivers is described below. The photo-receivers R1, R2 are each disposed point-symmetrically with respect to a central point O of the photo-receiver, on the X-axis 302. The photo-receivers TE 1, TE 2, TE 3, TE 4 are arranged in that order in a plus Y-direction, on the Y-axis 301.

The photo-receivers TS 1, TS 2, TS 3, TS 4 are arranged in that order from a minus side of the X-axis to a plus side thereof. The photo-receivers TS 1, TS 2, TS 3, TS 4 are each arranged in the plus Y-direction with a predetermined spacing from the X-axis 302. Additionally, the photo-receiver TS 2 is disposed in the minus X-direction with a predetermined spacing from the Y-axis 301, and the photo-receiver TS 3 is disposed in the plus X-direction with a predetermined spacing from the Y-axis 301.

The photo-receivers f1, f2, f3, f4, f5 are arranged in that order in a minus Y-direction, on the Y-axis 301. The photo-receivers f1, f2, f3, f4, f5 are where FES is generated using the knife-edge method. Accordingly, FIG. 3 assumes that regions generally called dark lines exist between the photo-receivers f1 and f2, between the photo-receivers f2 and f3, between the photo-receivers f3 and f4, and between the photo-receivers f4 and f5.

The photo-receivers TE 5, TE 6, TE 7, TE 8 are arranged in that order from the minus side of the X-axis to the plus side thereof. The photo-receivers TE 5, TE 6, TE 7, TE 8 are each arranged in the minus Y-direction with a predetermined spacing from the X-axis 302. Additionally, the photo-receiver TE 6 is disposed in the minus X-direction with a predetermined spacing from the Y-axis 301, and the photo-receiver TE 7 is disposed in the plus X-direction with a predetermined spacing from the Y-axis 301.

Next, which of the photo-receivers in the detector 007 the signal light beam that has been divided into each region of the diffraction grating 006 is converged on is described below. Hereinafter, of the signal light beam divided by the diffraction grating 006, the signal light beam component that becomes +1st-order light is expressed with a suffix +1, and the signal light beam component that becomes −1st-order light is expressed with a suffix −1. For example, the +1st-order light of the signal light beam incident upon the region A of the diffraction grating 006 is expressed as signal light beam A+1, and the −1st-order light of the particular signal light beam is expressed as signal light beam A−1. In addition, an image that the signal light beam A+1 will form when converged upon the detector 007 is expressed as signal beam spot A+1, for example.

The signal light beam incident upon the region A of the diffraction grating 006 is divided into the signal light beams A+1 and A−1. The signal light beam A+1 is converged centrally upon the photo-receiver TE 1 to form the signal beam spot A+1, and the signal light beam A−1 is converged upon the dark line between the photo-receivers f1 and f2 to form a signal beam spot A−1.

The signal light beam incident upon the region B of the diffraction grating 006 is divided into signal light beams B+1 and B−1. The signal light beam B+1 is converged centrally upon the photo-receiver TE 1 to form a signal beam spot B+1, and the signal light beam B−1 is converged centrally upon the dark line between the photo-receivers f4 and f5 to form a signal beam spot B−1.

The signal light beam incident upon the region C of the diffraction grating 006 is divided into signal light beams C+1 and C−1. The signal light beam C+1 is converged centrally upon the photo-receiver TE 2 to form a signal beam spot C+1, and the signal light beam C−1 is converged upon the dark line between the photo-receivers f2 and f3 to form a signal beam spot C−1.

The signal light beam incident upon the region D of the diffraction grating 006 is divided into signal light beams D+1 and D−1. The signal light beam D+1 is converged centrally upon the photo-receiver TE 3 to form a signal beam spot D+1, and the signal light beam D−1 is converged centrally upon the dark line between the photo-receivers f3 and f4 to form a signal beam spot D−1.

The signal light beam incident upon the region E of the diffraction grating 006 is divided into signal light beams E+1 and E−1. The signal light beam E+1 is converged centrally upon the photo-receiver TS 4 to form a signal beam spot E+1, and the signal light beam E−1 is converged centrally upon the photo-receiver TE 5 to form a signal beam spot E−1.

The signal light beam incident upon the region F of the diffraction grating 006 is divided into signal light beams F+1 and F−1. The signal light beam F+1 is converged centrally upon the photo-receiver TS 2 to form a signal beam spot F+1, and the signal light beam F−1 is converged centrally upon the photo-receiver TE 7 to form a signal beam spot F−1.

The signal light beam incident upon the region G of the diffraction grating 006 is divided into signal light beams G+1 and G−1. The signal light beam G+1 is converged centrally upon the photo-receiver TS 3 to form a signal beam spot G+1, and the signal light beam G−1 is converged centrally upon the photo-receiver TE 6 to form a signal beam spot G−1.

The signal light beam incident upon the region H of the diffraction grating 006 is divided into signal light beams H+1 and H−1. The signal light beam H+1 is converged centrally upon the photo-receiver TS 1 to form a signal beam spot H+1, and the signal light beam H−1 is converged centrally upon the photo-receiver TE 8 to form a signal beam spot F−1.

The signal light beam incident upon the region I of the diffraction grating 006 is divided into signal light beams I+1 and I−1. The signal light beam I+1 is converged centrally upon the photo-receiver R1 to form a signal beam spot I+1, and the signal light beam I−1 is converged centrally upon the photo-receiver R2 to form a signal beam spot I−1. The signal light beams I+1 and I−1 have only to be incident upon either of the photo-receivers R1 and R2. In this case, the light beam I+1 may be converged upon the center of the photo-receiver R2, and the light beam I−1 upon the center of the photo-receiver R.

As shown, the +/−1st-order signal light beams that have thus been obtained from the division in each region of the diffraction grating 006 are each converged at a point-symmetrical position relative to the central point O of the photo-receiver. The two photo-receivers that the +/−1st-order light beams divided in the predetermined regions of the diffraction grating enter are each disposed at a point-symmetrical position relative to the central point O of the photo-receiver. For example, the photo-receiver R1 for accepting the +1st-order light obtained from the division in the region I of the diffraction grating 006, and the photo-receiver R2 for accepting the −1st-order light are arranged point-symmetrically with respect to the central point O of the photo-receiver.

An appropriate electrical signal is generated according to the intensity of the signal light beam incident upon the photo-receiver. The RF signal, TES, and FES are obtained from thus-generated electrical signals per the following arithmetic expressions. In the following arithmetic expressions, the electrical signal that was generated from the photo-receiver R1, for example, is denoted as R1.

$$RF = R1 + R2 + TE1 + TE2 + TE3 + TE4 + TS1 + TS2 + TS3 + TS4 \quad (1)$$

$$PP = (TE1 + TE4) - (TE2 + TE3) \quad (2)$$

$$LE = (TS2 + TS4) - (TS1 + TS3) \quad (3)$$

$$TES1 = PP - K \times LE \quad (4)$$

$$TES2 = \text{(Phase difference between } TE6 \text{ and } TE7\text{)} + \text{(Phase difference between } TE5 \text{ and } TE8\text{)} \quad (5)$$

$$FES = (f2 + f4) - (f1 + f3 + f5) \quad (6)$$

where PP in expression (2) denotes a push-pull signal and LE in expression (3) denotes a lens error signal. Also, TES1 in expression (4) denotes TES generated in the single-beam DPP scheme, and K in expression (4) denotes a luminous intensity ratio between the push-pull signal and the lens error signal. Expression (4) indicates that as described above, the TES generated in the single-beam DPP scheme is based on the differential output between the push-pull signal and the lens error signal.

In addition, TES2 in expression (5) is TES based on the DPD scheme. The TES based on the DPD scheme is usually generated by dividing a signal light beam into a four-segment rectangular shape. As in the present embodiment, the signal light beams obtained by the division in the regions E, F, G, H of the diffraction grating can also be used to generate phase components needed in the DPD scheme.

The signal beam spot that the signal light beam will form on the detector 007 when the signal light beam is focused upon an information layer is, in terms of geometrical optics, a point, and in wave-optical terms, has an expanse with the point as a center. Signal beam spots are shown as geometrical-optical points in FIG. 3. These points are called on-detector focusing points.

To detect a total amount of light of the signal light beam, outlines of the photo-receivers need to be larger than the spot size of the signal light on the detector 007 that has a wave-optical expanse. As described later herein, a desirable minimal outline dimension of the photo-receivers is 24 μm or more. A semiconductor laser assumed as the light source 001 in the present embodiment has a feature that wavelength changes with a change in the amount of light of the exit optical beam. The change in the wavelength of the light source 001 is equivalent to a change in a wavelength of the signal light beam.

As the pitch of the diffraction grating is narrowed, the optical beam easily changes in diffraction angle with the change in the wavelength of the beam. The regions E, G, H, I of the diffraction grating 006 are arranged at a narrow pitch to make the signal light beam travel to the photo-receivers TS 1 to TS 4, photo-receivers TE 5 to TE 8, and photo-receivers R1, R2 arranged outside the detector 007. The diffraction angle of the signal light beam entering these regions is prone to change particularly with the change in the wavelength of the signal light beam. A change in the diffraction angle is equivalent to a change in a position of the signal beam spot formed on the detector 007. The position of the spot changes in a direction parallel to a direction vector connecting the detector central point O and a predetermined photo-receiver.

In the present embodiment, in order to detect the total amount of light of the signal light beam even in the event of a change in wavelength, the photo-receivers TS 1 to TS 4, photo-receivers TE 5 to TE 8, and photo-receivers R1, R2 arranged outside the detector 007 have a shape longer in the direction parallel to the direction vector connecting the detector central point O and the predetermined photo-receiver, than in a direction vertical to the direction vector. For example, the photo-receiver TS 1 has a shape longer in the Y-direction than in the X-direction, as shown in FIG. 3. This shape provides an effect that the photo-receiver can have a dimensional margin for the change in the diffraction angle.

Next, a signal beam spot formed on the detector 007 when the signal light beam gets defocused on the information layer is described below. Upon entering an in-focus state, the signal beam spot that the signal light beam will form on the detector 007 take the same geometrical-optical shape as that of the regions of the diffraction grating 006. In addition, the spot position changes with dependence upon positions of the diffraction grating's regions. For example, the optical beam that has entered the upper left region A of the diffraction grating 006 moves to upper left upon entering the in-focus state. Conversely upon entering an out-of-focus state, the signal beam spot that the signal light beam will form on the detector 007 takes a shape so that the spot under the in-focus state assumes a shape point-symmetrical to the on-detector focusing points. In addition, the spot position likewise changes in a point-symmetrical direction. For example, the optical beam that has entered the upper left region A of the diffraction grating 006 moves to lower right upon entering the out-of-focus state.

Figure 4:
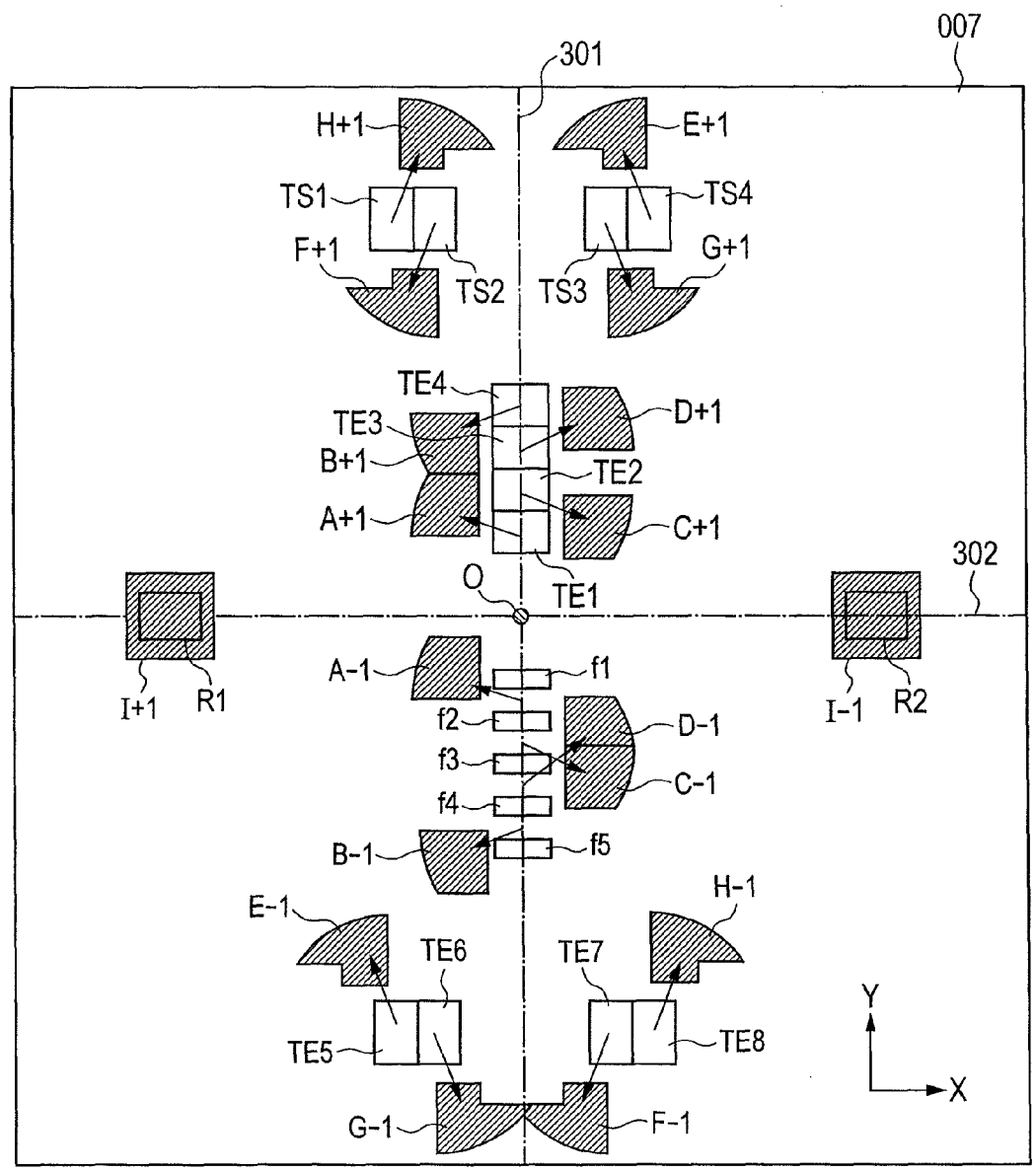
FIG. 4 is a diagram that illustrates directions in which signal light beams formed on the detector 007 of the first embodiment will move under an in-focus state.

FIG. 4 shows the signal beam spots that signal light beams will form on the detector 007 upon entering the in-focus state. Arrows in FIG. 4 indicate directions in which the signal light beams move in focus.

Signal light beams A+1 and A−1 move to upper left, forming signal beam spots A+1 and A−1, respectively. The signal beam spots A+1 and A−1 are of exactly the same shape as that of the signal light beams formed by the division in the region A of the diffraction grating 006. In addition, the beams move in a direction of an upper left region, that is, the region A of the diffraction grating 006.

Signal light beams B+1 and B−1 move to lower left, forming signal beam spots B+1 and B−1, respectively.

Signal light beams C+1 and C−1 move to lower right, forming signal beam spots C+1 and C−1, respectively.

Signal light beams D+1 and D−1 move to upper right, forming signal beam spots D+1 and D−1, respectively.

Signal light beams E+1 and E−1 move to upper left, forming signal beam spots E+1 and E−1, respectively.

Signal light beams F+1 and F−1 move to lower left, forming signal beam spots F+1 and F−1, respectively.

Signal light beams G+1 and G−1 move to lower right, forming signal beam spots G+1 and G−1, respectively.

Signal light beams H+1 and H−1 move to upper right, forming signal beam spots H+1 and H−1, respectively.

Signal light beams I+1 and I−1 remain on central sections of the photo-receivers R1 and R2, forming significantly blurry signal beam spots I+1 and I−1, respectively.

As described above, the signal beam spots under the in-focus state move in the directions of the arrows, shown in FIG. 4. In these directions, there is no photo-receiver involved with the generation of FES and TES. This is because the detector is so constructed that the signal beam spots formed on thereon upon entering the in-focus state will not enter the photo-receivers involved with the generation of FES and TES.

Figure 5:
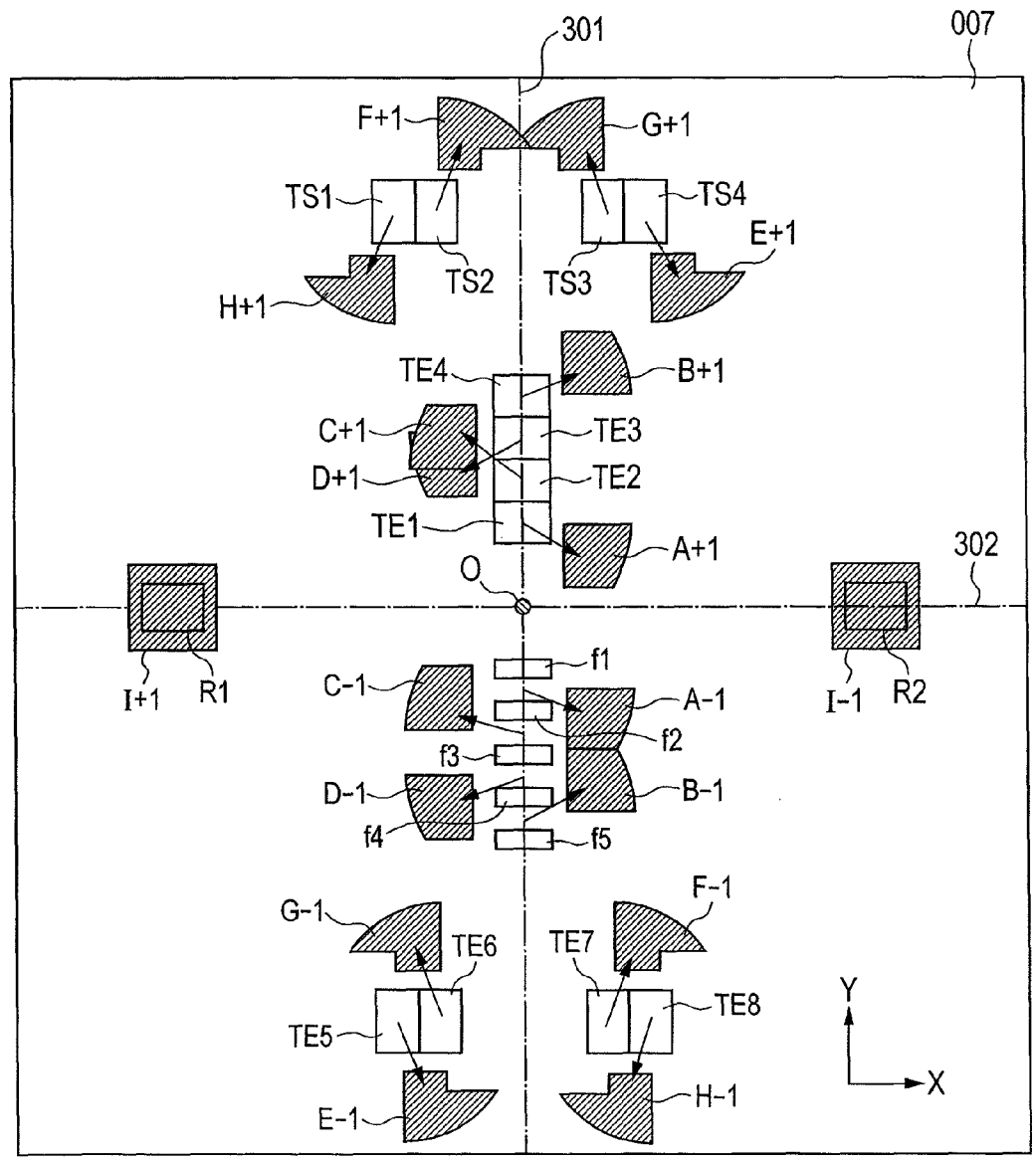
FIG. 5 is a diagram that illustrates directions in which signal light beams formed on the detector 007 of the first embodiment will move under an out-of-focus condition.

FIG. 5 shows the signal beam spots that signal light beams will form on the detector 007 upon entering the out-of-focus state. Arrows in FIG. 5 indicate directions in which the signal light beams move under the out-of-focus state.

Signal light beams A+1 and A−1 move to lower right, forming signal beam spots A+1 and A−1, respectively. Shapes of the signal beam spots A+1 and A−1 formed on the detector 007 by the signal light beams upon entering the out-of-focus state are exactly point-symmetrical to the centers of the photo-receivers. In addition, the beams move in a direction of a lower right region, where the beams are also point-symmetrical to the moving direction of the beams under the in-focus state.

Signal light beams B+1 and B−1 move to upper right, forming signal beam spots B+1 and B−1, respectively.

Signal light beams C+1 and C−1 move to upper left, forming signal beam spots C+1 and C−1, respectively.

Signal light beams D+1 and D−1 move to lower right, forming signal beam spots D+1 and D−1, respectively.

Signal light beams E+1 and E−1 move to lower right, forming signal beam spots E+1 and E−1, respectively.

Signal light beams F+1 and F−1 move to upper right, forming signal beam spots F+1 and F−1, respectively.

Signal light beams G+1 and G−1 move to upper left, forming signal beam spots G+1 and G−1, respectively.

Signal light beams H+1 and H−1 move to lower left, forming signal beam spots H+1 and H−1, respectively.

Signal light beams I+1 and I−1 form significantly blurry signal beam spots I+1 and I−1, respectively.

As described above, the signal beam spots under the out-of-focus state move in the directions of the arrows, shown in FIG. 5. In the directions of these arrows, there is no photo-receiver involved with the generation of FES and TES. This is because the detector is so constructed that as with the signal beam spots formed upon entering the in-focus state, the signal beam spots formed on thereon upon entering the out-of-focus state will not enter the photo-receivers involved with the generation of FES and TES.

As shown in FIGS. 4, 5, the photo-receiver involved with FES and TES generation are arranged so that the signal beam spots formed on the detector 007 will be absent in the direction that the beams move in the defocused state. Next, a beam spot that an unwanted light beam will form on the detector 007 is described below. This beam spot will be hereinafter called the unwanted beam spot.

During reproduction from the information layer 012, the unwanted light beam that has been reflected the information layer 011 stems from a position nearer to the objective lens 004 than to the focusing point of the optical beam incident upon the double-layered disc. This unwanted light beam is equivalent to a signal light beam that has entered the in-focus state. The unwanted beam spot that the unwanted light beam forms on the detector 007 will behave the same as the signal beam spot that the signal light beam forms on the detector 007 following the entry of the beam into the in-focus state. More specifically, the unwanted beam spot will behave as shown in FIG. 4, and this means that the unwanted optical beam generated at the information layer 011 does not enter the photo-receivers involved with FES and TES generation.

During reproduction from the information layer 011, the unwanted light beam that has been reflected the information layer 012 stems from a position farther to the objective lens 004 than to the focusing point of the optical beam incident upon the double-layered disc. This unwanted light beam is equivalent to a signal light beam that has entered the out-of-focus state. The unwanted beam spot that the unwanted light beam forms on the detector 007 will behave the same as the signal beam spot that the signal light beam forms on the detector 007 following the entry of the beam into the out-of-focus state. More specifically, the unwanted beam spot will behave as shown in FIG. 5, and this means that the unwanted optical beam generated at the information layer 012 does not enter the photo-receivers involved with FES and TES generation.

As described above, the detector is constructed so that irrespective of whether the information is to be reproduced from the information layer 011 or information layer 012 of the double-layered disc, the unwanted light beam arising from the information layer not being used for the reproduction will not enter the light-receiving layers involved with FES and TES generation. There is an effect, therefore, that FES and TES free from noise due to such unwanted light beams can be obtained. Briefly, the optical pickup 100 of the present embodiment is adapted to conduct stable focus control and tracking control.

Meanwhile, existent diffraction gratings divide an incident optical beam into not only +/−1st-order light beams, but also +/−2nd-order light beams and higher-order ones. If the +/−1st-order signal light beams obtained from the division in a predetermined region of the diffraction grating 006, and the +/−2nd-order or higher-order signal light beams obtained from the division in regions other than the predetermined region enter the photo-receivers for FES/TES generation at the same time, FES/TES noise will result. In order to avoid this, there is a need to provide a preventive measure so that the higher-order signal light beams resulting from the division by the diffraction grating will not enter the photo-receivers used for FES/TES generation.

Figure 6:
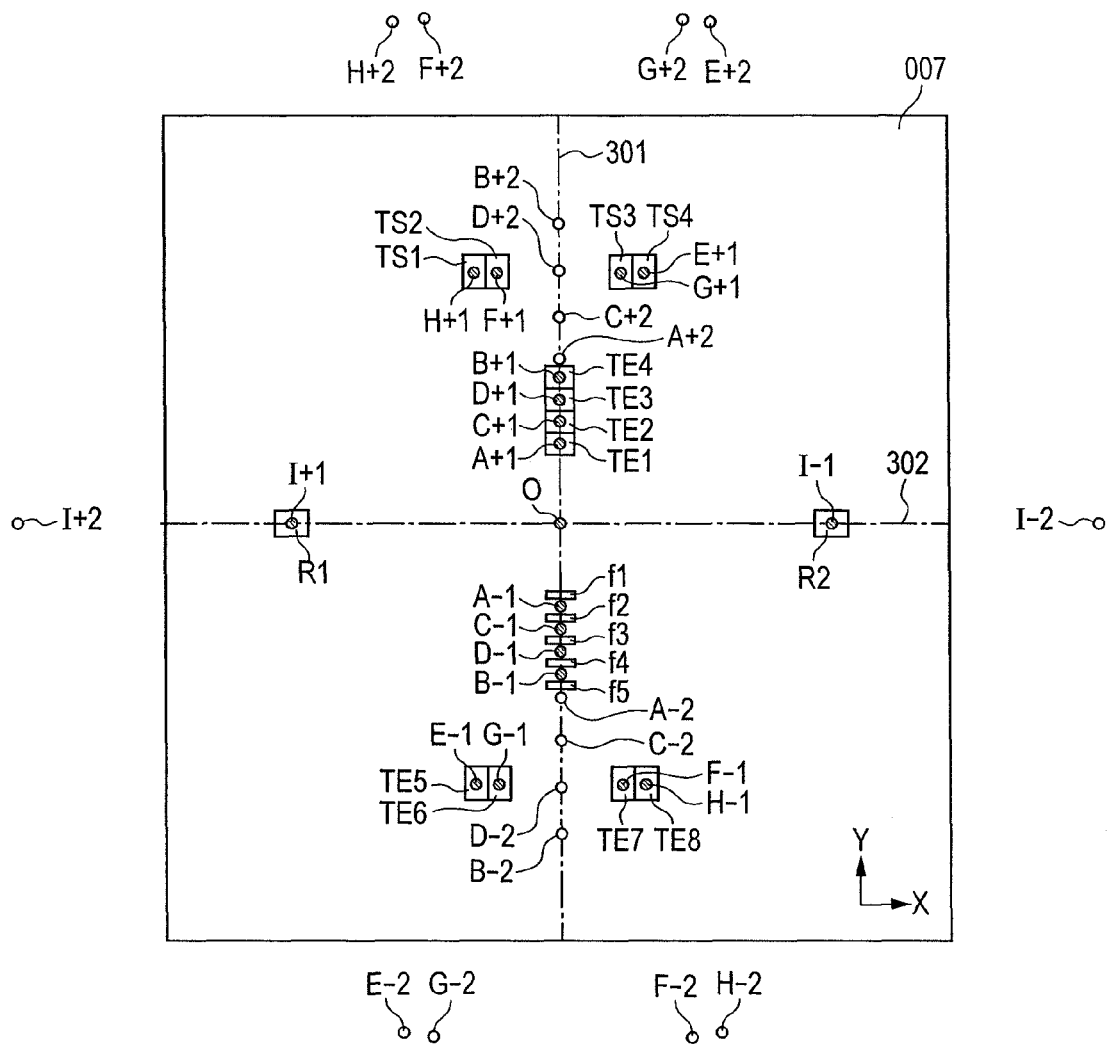
FIG. 6 is a diagram that illustrates signal beam spots formed on the detector 007 by signal light beams of second-order light after beam division by the diffraction grating 006 of the first embodiment.

FIG. 6 shows the signal beam spots formed on the detector 007 by the +/−1st-order and +/−2nd-order signal light beams resulting from the division by the diffraction grating 006 when an optical beam is focused on an information layer. In FIG. 6, of all the signal light beams resulting from the division by the diffraction grating 006, only the +2nd-order light is expressed with a suffix +2, and the −2nd-order light is expressed with a suffix −2. For example, the +2nd-order light that has been diffracted in the region A of the diffraction grating 006 is expressed as signal light beam A+2, and diffracted −2nd-order light is expressed as signal light beam A−2. In addition, an image that the signal light beam A+2 will form on the detector 007 is expressed as signal beam spot A+2, for example. Since the optical beam is focused on the information layer, the signal light beams of the +/−2nd-order light become points, as with the signal light beams of the +/−1st-order light. The points of the signal beam spots are shown as circles in FIG. 6.

The beam diffraction angle of the 2nd-order light divided by the diffraction grating 006 is twice that of the 1st-order light. Because of this, the signal beam spots of the 2nd-order light are positioned on the detector 007 at twice a distance from the detector central point O to the signal beam spots of the 1st-order light. That is, the signal beam spot 1+2, for example, is positioned at twice the distance from the detector central point O to the signal beam spot I+1, as shown in FIG. 6. Similarly, the other signal beam spots of the +/−2nd-order light are formed at the positions shown in FIG. 6.

In the present embodiment, the detector is engineered to prevent the signal beam spots of the 2nd-order light from entering the photo-receivers for FES and TES generation, as shown in FIG. 6. As can be seen therefrom, the signal beam spot A+2 and the photo-receiver TE 4 are in closest proximity to each other, with all other signal beam spots of the 2nd-order light being sufficiently spaced apart from the respective photo-receivers. Preventing the signal beam spot A+2 from being formed on the photo-receiver TE 4 enables all 2nd-order light to be prevented from entering the photo-receivers.

Figure 7:
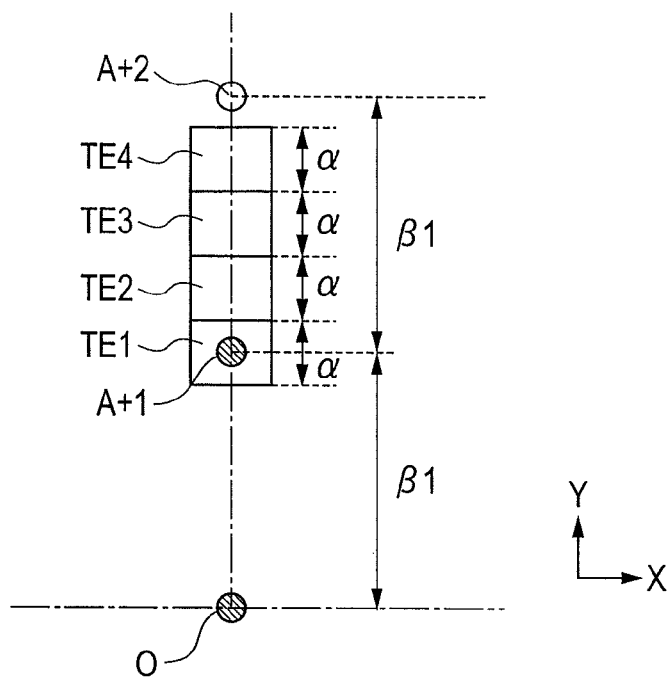
FIG. 7 is an enlarged, schematic representation of photo-receivers TE 1 to TE 4 formed on the detector 007 of the first embodiment.

FIG. 7 is an enlarged schematic representation of the photo-receivers TE 1 to TE 4 and signal beam spots A+1 and A+2 shown in FIG. 6. The size of the photo-receivers TE 1 to TE 4 in the Y-direction is defined as photo-receiver length α. If the clearance between the signal beam spot A+1 and the detector central point O is defined as a center-to-center distance β1, the clearance between the signal beam spot A+2 and the detector central point O is twice the center-to-center distance 131, that is, 2×β1.

Likewise, since as shown in FIG. 7, the photo-receivers TE 2, TE 3, TE 4, each having the length α, and a half of the photo-receiver TE 1, which is also of the length α, are arranged between the signal beam spots A+1 and A+2, a clearance between the central point O of the photo-receiver TE 4 and an upper end of this photo-receiver can be expressed as β1+(3+½)×α.

To prevent the signal beam spot A+2 from being formed on the photo-receiver TE 4, therefore, the center-to-center distance in and the photo-receiver length a have only to be determined so that expression (9) is satisfied.

$$2 \times \beta 1 \geq \beta 1 + (3 + \tfrac{1}{2}) \times \alpha \tag{9}$$

As described above, the minimum size of the photo-receiver, that is, the length a thereof, is defined as 24 μm. In this case, expression (9) can be satisfied by assigning a value equal to or greater than 84 μm as the center-to-center distance β1. This means that if center-to-center distance β1≧84 μm, the signal beam spot A+2 can be prevented from being formed on the photo-receiver TE 4.

Accordingly, if a distance between the center of the detector and that of the photo-receiver TE 1, the nearest of the photo-receivers TE 1 to TE 4 on the detector to the center of the detector, is taken as a center-to-center distance β1, incidence of the 2nd-order light upon that photo-receiver can be prevented by limiting the distance between the center of the detector and the light-receiving region of the photo-receiver TE 4, farthest from the center of the detector, to not more than twice the center-to-center distance β1. Next, the size (spot diameter ϕ) of the signal beam spots formed on the detector is described below.

In generally, the spot diameter ϕ of the light which has been collected by a collimating lens is represented by the following Airy disc formula using a wavelength λ of the optical beam and the NA (hereinafter referred to as NACP) of the collimating lens:

$$\phi = \xi \times \lambda / NACP \tag{10}$$

where ξ is a coefficient determined by an intensity distribution of the signal light beam entering the collimating lens, and is usually 2 for a semiconductor-laser-emitted signal light beam having a Gaussian type of intensity distribution.

In addition, a focal length (hereinafter referred to as FCP) of the collimating lens, an effective diameter (hereinafter referred to as APCP) of the optical beam entering the collimating lens, and NACP are usually expressed as follows:

$$NACP = APCP/(2 \times FCP) \tag{11}$$

Likewise, a focal length (hereinafter referred to as FOBJ) of the objective lens, an effective diameter (hereinafter referred to as APOBJ) of the optical beam entering the objective lens, and NA (hereinafter referred to as NAOBJ) of the objective lens, are usually expressed as follows:

$$NAOBJ = APOBJ/(2 \times FOBJ) \tag{12}$$

In an ordinary optical pickup, it can be safely considered that APOBJ and APCP are equal. Upon considering this relationship and putting expressions (10), (11), (12) together, one can express the spot diameter ϕ as follows:

$$\phi = 2/\pi \times \lambda \times M/NAOBJ \tag{13}$$

where M denotes optical magnification (FCP÷FOBJ). The optical magnification is hereinafter referred to as M.

Optical systems of the BD type are generally set to range between 9 and 13 in terms of the optical magnification M, so the present embodiment assumes a optical magnification-M setting of 9-13 times. Since, as can be seen from expression (13), the spot diameter ϕ is proportional to the optical magnification M, when the optical magnification M is set to be 13 times, the spot diameter ϕ becomes its maximum. Substituting optical magnification M=13 times, wavelength λ=405 nm, and NAOBJ=0.85, to expression (13), allows one to see that a maximum spot diameter ϕ of 4 μm is obtained in the assumed optical magnification-M range.

A minimum allowable size of the photo-receivers on the detector 007 needs to allow for assembling tolerances for the detector, as well as not to be too large relative to the maximum spot diameter. Assembling tolerances of about ±10 μm are assumed for a standard optical pickup. Accordingly, the minimum allowable size of the photo-receivers is desirably set to be larger than 24 μm in consideration of the spot diameter ϕ of 4 μm and the tolerances of ±10 μm. The above 24-μm minimum allowable size of the photo-receivers was calculated from the assembling tolerances and the spot diameters on the detector.

As describe above, the optical pickup 100 of the present embodiment incorporates design considerations so that during double-layered disc recording or reproduction, the unwanted light beam reflected from the information layer not being used for the reproduction will enter neither the photo-receivers for TES generation, nor the photo-receivers for FES generation. The optical pickup 100 is further designed so that the 2nd-order or higher-order optical beams occurring in the diffraction grating will be prevented from entering the photo-receivers for TES and FES generation. Noiseless FES and TES can therefore be obtained. Additionally, since the diffraction grating 006 is disposed on the outbound path, the diffraction grating having significant cost impacts can be manufactured inexpensively. Furthermore, since the optical pickup 100 of the present embodiment is constructed without a detection lens, the number of components required and the assembly steps involved can be reduced to enable less expensive production than with the technique described in JP-A-2004-281026. The optical pickup 100 of the present embodiment, adapted for conducting stabilized focus control and tracking control, can be manufactured at low costs.

It should be noted that the optical pickup of the present embodiment includes at least a light source, a light-branching element, a collimating lens, an objective lens, a diffraction grating, and a detector; the optical pickup, unlike that of FIG. 1, may be an optical system deformed using a mirror, for example.

(Second Embodiment)

A modification in the optical pickup of the first embodiment is described below as a second embodiment. The optical pickup of the second embodiment, a modification in the optical pickup 100 of the first embodiment, differs from the optical pickup 100 of the first embodiment in terms of region layout in a diffraction grating and photo-receiver layout in a detector. The present embodiment, as with the first embodiment, envisages information reproduction from a double-layered disc having a 25-μm space between two information layers.

Figure 8:
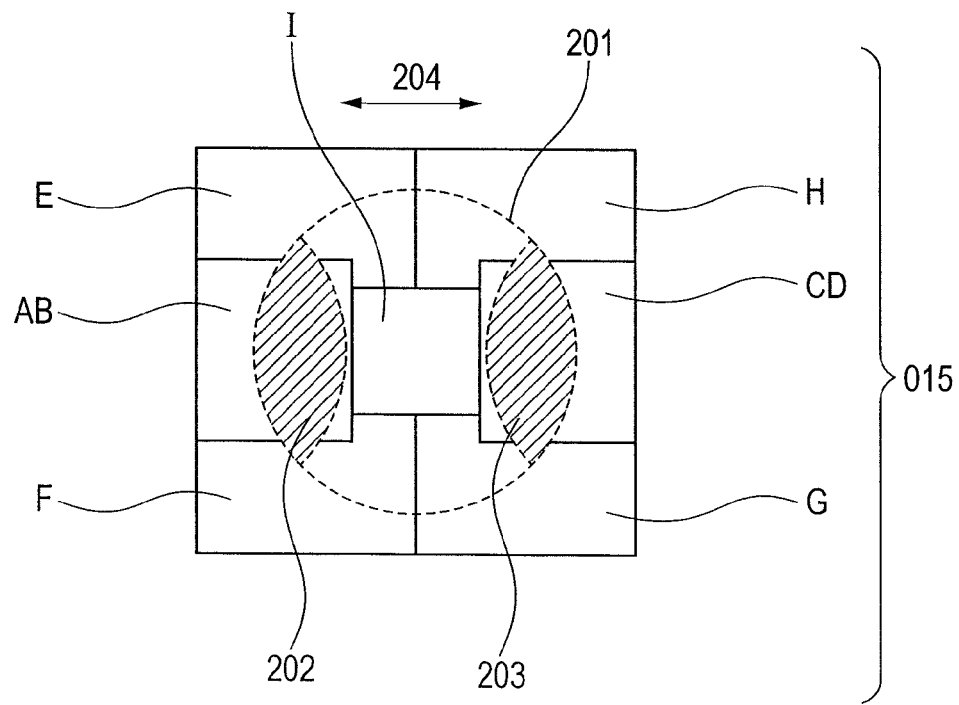
FIG. 8 is a diagram illustrating a diffraction grating 015 of a second embodiment.

FIG. 8 shows the diffraction grating 015 of the second embodiment, as viewed from the detector side. The diffraction grating 015 includes a region AB, which is equivalent to a region formed by combining the regions A and B of the diffraction grating 006. The diffraction grating 015 also includes a region CD, which is equivalent to a region likewise formed by combining the regions C and D of the diffraction grating 006. The regions AB and CD of the diffraction grating 015, as with those of the diffraction grating 006, assume the blazed type of diffraction grating that divides an incident optical beam into +1st-order light and −1st-order light and yields a luminous intensity ratio of 4:1 between the +1st-order light and the −1st-order light. Other regions of the diffraction grating 015, namely, E, F, G, H, are the same ones as of the diffraction grating 006, and further detailed description of these regions is therefore omitted.

Since the present embodiment also assumes single-beam DPP, a signal light beam requires division into beams corresponding to push-pull regions and other regions. As shown in FIG. 8, the diffraction grating 015 is divided into the regions AB, CD that are the push-pull regions, and the regions E, F, G, H, I that are the other regions.

Figure 9:
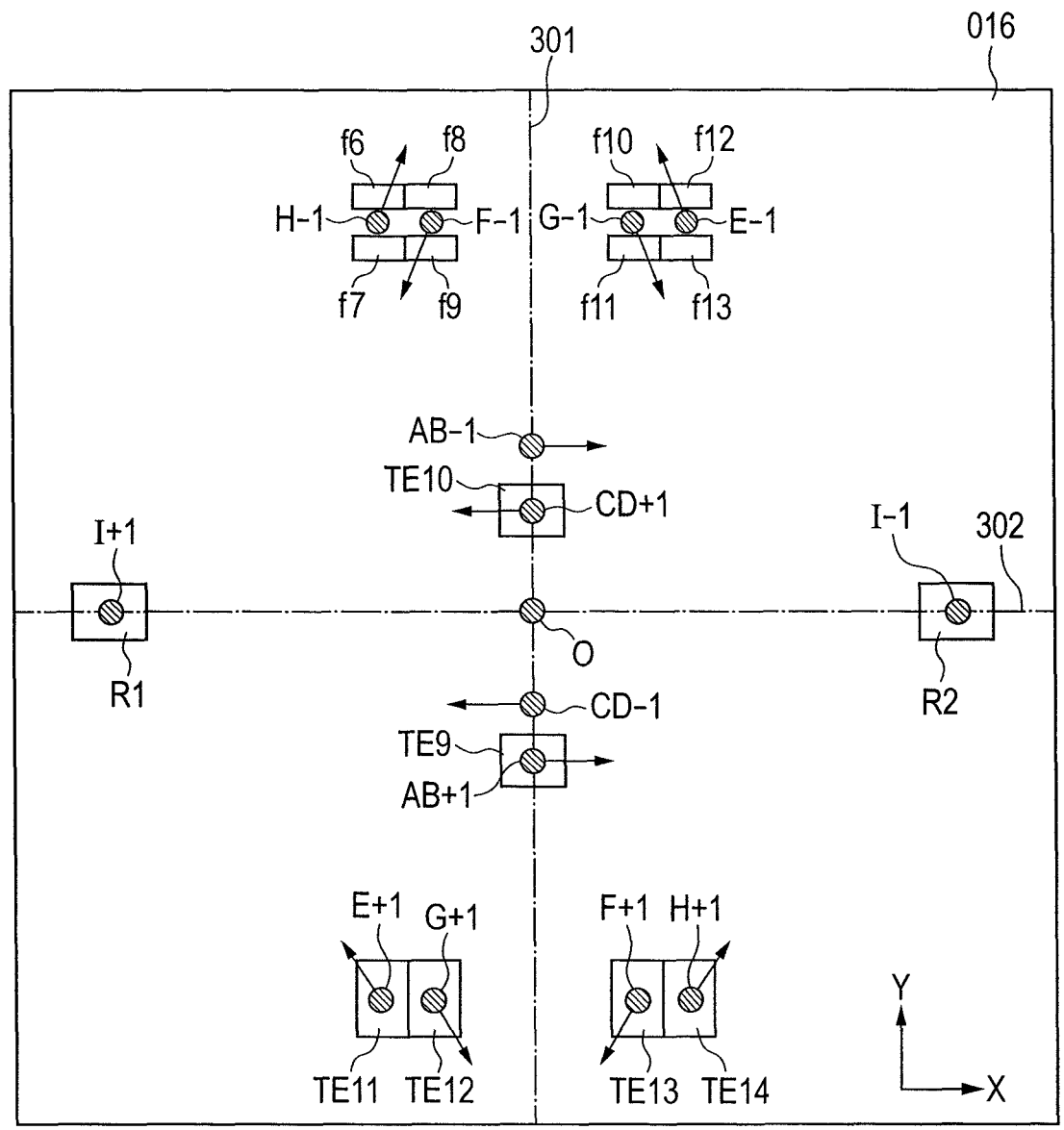
FIG. 9 is a diagram illustrating a detector 016 of the second embodiment.

The following describes the detector 016 of the present embodiment. FIG. 9 shows the detector 016 viewed from a minus Z-direction, and assumes that the signal light beam is focused on an information layer. In FIG. 9, the horizontal direction is defined as an X-direction, and the vertical direction as a Y-direction. A central point of the detector 016 is denoted as O, which is equivalent to a position upon which a signal light beam that has been passed through the diffraction grating 015, not divided thereby, is converged. In FIG. 9, a dashed-and-dotted line passing through the detector central point O, in the X-direction, is shown as an X-axis 302, and a dashed-and-dotted line passing through the detector central point O, in the Y-direction, is shown as a Y-axis 301.

The detector 016 internally has 16 photo-receivers, namely, TE 9 to TE 14, R1 and R2, and f6 to f13. Layout of these photo-receivers is as shown in FIG. 9. The layout of the photo-receivers is described below.

The photo-receivers R1, R2 are each disposed point-symmetrically with respect to a central point O of the photo-receiver, on the X-axis 302. These photo-receivers are the same as those provided in the detector 007 of the first embodiment. The photo-receiver TE 9 is disposed with a predetermined clearance with respect to the detector center, in a minus Y-direction on the Y-axis 301. The photo-receiver TE 10 is disposed with a predetermined clearance with respect to the detector center, in a plus Y-direction on the Y-axis 301. As shown, the clearance between the photo-receiver TE 9 and the detector central point O is greater than the clearance between the photo-receiver TE 10 and the detector central point O. The photo-receivers TE 11, TE 12, TE 13, TE 14 are arranged in that order from a minus side of the X-axis to a plus side thereof. The photo-receivers TE 11, TE 12, TE 13, TE 14 are each arranged in the minus Y-direction with a predetermined clearance from the X-axis 302. Additionally, the photo-receiver TE 12 is disposed in the minus X-direction with a predetermined clearance from the Y-axis 301, and the photo-receiver TE 13 is disposed in the plus X-direction with a predetermined clearance from the Y-axis 301.

The photo-receivers f6, f8, f10, f12 are arranged in that order from the minus side of the X-axis to the plus side thereof. The photo-receivers f7, f9, f11, f13 are also arranged in that order from the minus side of the X-axis to the plus side thereof. The photo-receivers f6, f8, f10, f12 and the photo-receivers f7, f9, f11, f13 are each arranged in the plus Y-direction with a predetermined clearance from the X-axis 302. The photo-receivers f6, f7, f8, f9, f10, f11, f12, f13 are where FES is generated using the knife-edge method. Accordingly, FIG. 9 assumes that regions generally called dark lines exist between the photo-receivers f6 and f7, between the photo-receivers f8 and f9, between the photo-receivers f10 and f11, and between the photo-receivers f12 and f13.

Next, which of the photo-receivers in the detector 016 the signal light beam that has been divided into each region of the diffraction grating 015 is converged on is described below. Similarly to the first embodiment, hereinafter, of the signal light beam divided by the diffraction grating 015, the signal light beam component that becomes +1st-order light is expressed with a suffix +1, and the signal light beam component that becomes −1st-order light is expressed with a suffix −1. For example, the +1st-order light of the signal light beam incident upon the region AB of the diffraction grating 015 is expressed as signal light beam AB+1, and the −1st-order light of the particular signal light beam is expressed as signal light beam AB−1. In addition, an image that the signal light beam A+1 will form when converged upon the detector 016 is expressed as signal beam spot AB+1, for example.

The signal light beam incident upon the region AB of the diffraction grating 015 is divided into the signal light beams AB+1 and AB−1. The signal light beam AB+1 is converged centrally upon the photo-receiver TE 9 to form the signal beam spot AB+1, and the signal light beam AB−1 is converged at a position in the plus Y-direction from the photo-receiver TE 10 to form the signal beam spot AB−1.

The signal light beam incident upon the region CD of the diffraction grating 015 is divided into signal light beams CD+1 and CD−1. The signal light beam CD+1 is converged centrally upon the photo-receiver TE 10 to form a signal beam spot CD+1, and the signal light beam CD−1 is converged at a position in the plus Y-direction from the photo-receiver TE 9 to form a signal beam spot CD−1.

The signal light beam incident upon the region E of the diffraction grating 015 is divided into signal light beams E+1 and E−1. The signal light beam E+1 is converged centrally upon the photo-receiver TE 11 to form a signal beam spot E+1, and the signal light beam E−1 is converged upon the dark line between the photo-receivers f12 and f13 to form a signal beam spot E−1.

The signal light beam incident upon the region F of the diffraction grating 015 is divided into signal light beams F+1 and F−1. The signal light beam F+1 is converged centrally upon the photo-receiver TE 13 to form a signal beam spot F+1, and the signal light beam F−1 is converged centrally upon the dark line between the photo-receivers f8 and f9 to form a signal beam spot F−1.

The signal light beam incident upon the region G of the diffraction grating 015 is divided into signal light beams G+1 and G−1. The signal light beam G+1 is converged centrally upon the photo-receiver TE 12 to form a signal beam spot G+1, and the signal light beam G−1 is converged centrally upon the dark line between the photo-receivers f10 and f11 to form a signal beam spot G−1.

The signal light beam incident upon the region H of the diffraction grating 015 is divided into signal light beams H+1 and H−1. The signal light beam H+1 is converged centrally upon the photo-receiver TE 14 to form a signal beam spot H+1, and the signal light beam H−1 is converged centrally upon the dark line between the photo-receivers f6 and f7 to form a signal beam spot H−1.

The signal light beam incident upon the region I of the diffraction grating 015 is divided into the signal light beams I+1 and I−1. The signal light beam I+1 is converged centrally upon the photo-receiver R1 to form the signal beam spot I+1, and the signal light beam I−1 is converged centrally upon the photo-receiver R2 to form a signal beam spot I−1.

The signal light beams I+1 and I−1 have only to be incident upon either of the photo-receivers R1 and R2. In this case, the light beam I+1 may be converged upon the center of the photo-receiver R2, and the light beam I−1 upon the center of the photo-receiver R1.

An appropriate electrical signal is generated according to the intensity of the signal light beam incident upon the photo-receiver. The RF signal, TES, and FES are obtained from thus-generated electrical signals per the following arithmetic expressions. In the following arithmetic expressions, the electrical signal that was generated from the photo-receiver R1, for example, is denoted as R1.

$$RF = R1 + R2 + TE9 + TE10 + TE11 + TE12 + TS13 + TS14 \quad (14)$$

$$PP = TE9 - TE10 \quad (15)$$

$$LE = (TS11 + TS13) - (TS12 + TS14) \quad (16)$$

$$TES1 = PP - K \times LE \quad (17)$$

$$TES2 = (\text{Phase difference between } TE13 \text{ and } TE12) + (\text{Phase difference between } TE14 \text{ and } TE11) \quad (18)$$

$$FES = (f7 + f8 + f10 + f13) - (f6 + f9 + f11f2) \quad (19)$$

where PP in expression (15) denotes a push-pull signal and LE in expression (16) denotes a lens error signal. Also, TES1 in expression (17) denotes TES generated in the single-beam DPP scheme, and K in expression (17) denotes a luminous intensity ratio between the push-pull signal and the lens error signal. Additionally, TES2 in expression (18) denotes TES based on the DPD scheme. As in the first embodiment, phase components needed in the DPD scheme are generated from the signal light beams obtained by the division in the regions E, F, G, H of the diffraction grating.

In the figure, the signal beam spots AB−1 and CD−1 are formed outside the respective photo-receivers and not used for the generation of TES, FES, and the RF signal. However, the photo-receivers may be arranged at the forming locations of the signal beam spots AB−1 and CD−1 and used for RF signal generation. In addition, since the signal beam spots AB−1 and CD−1 are not used, the regions AB and CD of the diffraction grating 015 may be those of the blazed-type diffraction grating formed so that the luminous intensity ratio between +1st-order light and −1st-order light is 1:0.

In order to detect a total amount of light of the signal light beam, outlines of the photo-receivers in the present embodiment also need to be larger than the spot size of the signal light on the detector 016 that has a wave-optical expanse. A desirable minimal outline dimension of the photo-receivers in the present embodiment is 24 µm, as in the first embodiment.

In order to detect the total amount of light of the signal light beam even when the wavelength changes, the present embodiment is so constructed that the photo-receivers TE 11 to TE 14 and photo-receivers R1, R2 arranged outside the detector 016 have an outline extended in a direction parallel to a direction vector connecting the central point O of the detector and the predetermined photo-receiver. On the photo-receiver TE 11, for example, the change in wavelength causes a greater shift in a position of the spot in the Y-direction than in the X-direction. Thus, as shown in FIG. 9, the outline of the photo-receiver TE 11 is larger in the Y-direction than in the X-direction.

Arrows in FIG. 9 indicate directions in which the signal light beams move in focus. It can be seen that similarly to the first embodiment, the photo-receivers involved with the generation of FES and TES are not arranged in directions that the signal beam spots move in focus.

Upon entering the out-of-focus state, the signal beam spots move in directions opposite to those in which the signal light beams move in focus. The photo-receivers involved with the generation of FES and TES are not arranged in directions that the signal beam spots move under the out-of-focus state, either. That is, as in the first embodiment, the photo-receivers involved with the generation of FES and TES are arranged to steer clear of a direction in which a defocused signal beam spot formed on the detector 016 will move.

As with that of the first embodiment, an unwanted light beam in the double-layered disc is equivalent to a defocused signal light beam. The photo-receivers involved with the generation of FES and TES, in the present embodiment, are likewise arranged to steer clear of the direction in which a defocused signal beam spot may move along the surface of the detector 016. The unwanted light beam, therefore, is substantially unlikely to enter the photo-receivers involved with the generation of FES and TES.

The detector in the present embodiment is so constructed that the unwanted light beam stemming from the information layer not being used for reproduction from the double-layered disc will be prevented from entering the photo-receivers involved with the generation of FES and TES. Therefore, FES and TES that are free of noise due to the unwanted light beam can be obtained. The optical pickup of the present embodiment is also adapted to conduct stabilized focus control and tracking control.

Figure 10:
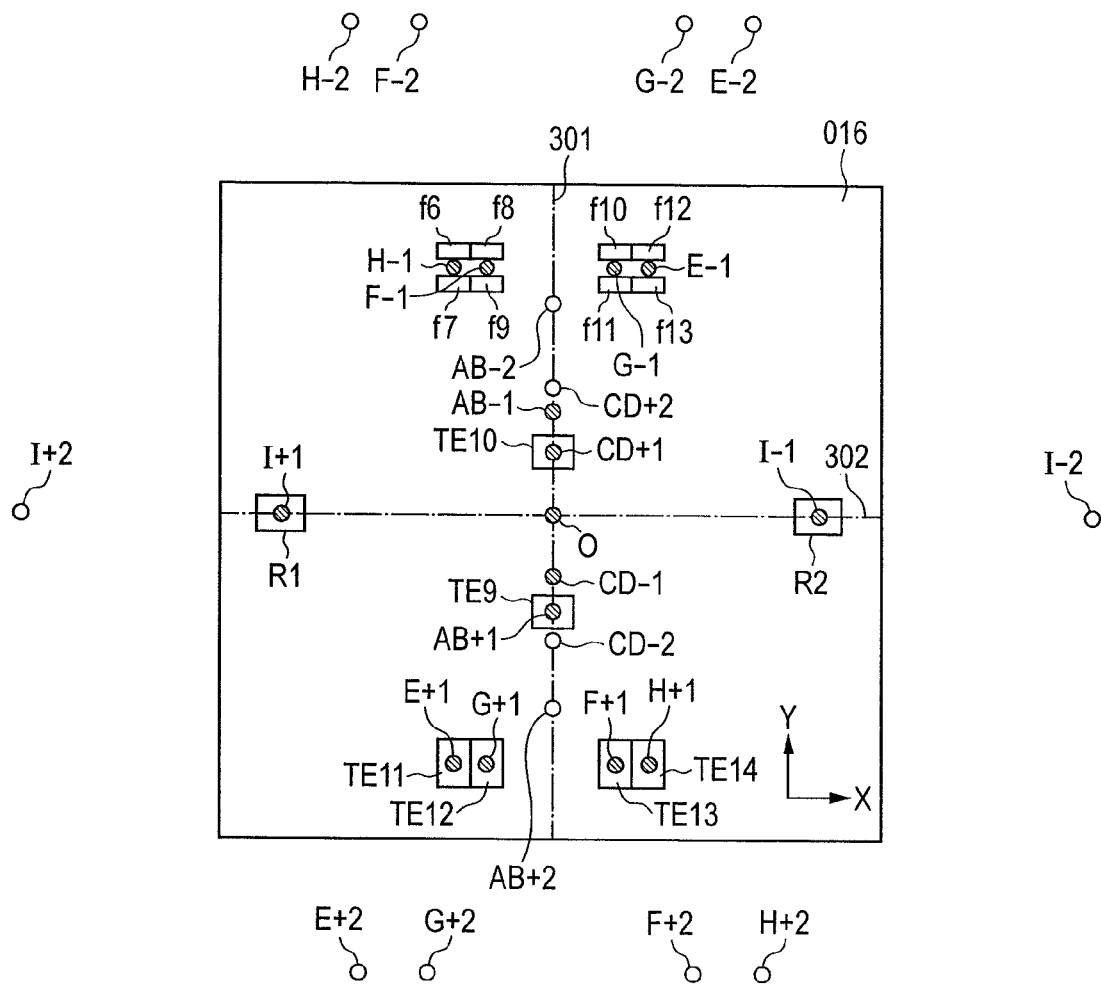
FIG. 10 is a diagram that illustrates signal beam spots formed on the detector 016 by signal light beams of second-order light after beam division by the diffraction grating 015 of the second embodiment.

FIG. 10 shows the signal beam spots that the +/−1st-order and +/−2nd-order signal light beams obtained by beam division in the diffraction grating 015 will form on the detector 016 when the original optical beam is focused on the information layer. FIG. 10 indicates that the present embodiment, as with the first embodiment, is designed to prevent the signal beam spots of the 2nd order from being formed on the photo-receivers for FES/TES generation. Taking care not to allow the signal light beam CD−2 to enter the photo-receiver TE 9 is desirable since the beam CD−2 is in closest proximity to the photo-receiver.

As described above, even when the diffraction grating 015 and detector 016 of the present embodiment are used, the unwanted light beams or high-order signal light beams reflected on the double-layered disc do not enter the photo-receivers for FES/TES generation. During double-layered disc recording or reproduction, therefore, noiseless FES and TES can be obtained and focus control and tracking control are stabilized as a result.

(Third Embodiment)

Using the optical pickup of the first embodiment to reproduce information from a triple-layered optical disc having three information layers is described as a third embodiment. Standards specify that double-layered discs should have a 25-μm space between the two information layers. The present embodiment envisages a triple-layered disc formed by adding a third information layer to a surface side of a double-layered disc, with the same space of 25 μm as that of double-layered discs, In the present embodiment, the triple-layered disc is denoted as 017, an information layer located nearest to the surface of the triple-layered disc, as 019, an intermediate information layer as 020, and an information layer located farthest from the surface, as 021. Interlayer tolerances for the three information layers are ±5 μm, the same tolerances as defined in double-layered disc standards. The space between the information layer 019 nearest the surface, and the information layer 021 farthest therefrom, is hereinafter referred to as maximum space. The maximum space in the triple-layered disc 017 assumed here is commonly 50 μm, or with the above tolerances taken into account, 60 μm.

Figure 11:
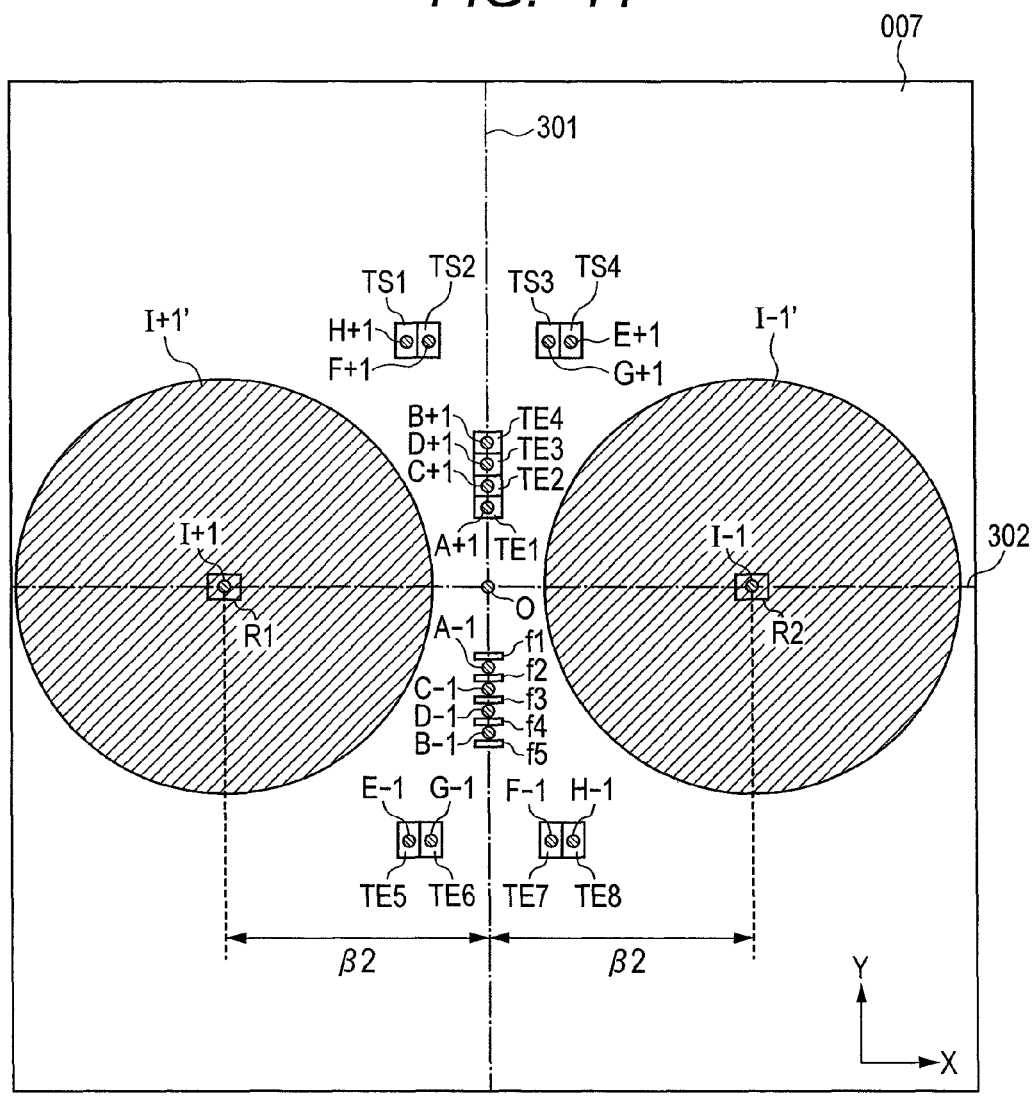
FIG. 11 is a diagram that illustrates both signal beam spots and unwanted beam spots that occur in a third embodiment during information reproduction from a triple-layered disc.

FIG. 11 is a diagram that shows the unwanted beam spots and signal beam spots that the unwanted light beams and signal light beams reflected from the information layer 021 will form on the detector 007 when information is reproduced from the information layer 019. In FIG. 11, in order to handle signal light beams and unwanted light beams separately, the unwanted +1st-order light beams obtained by the division in each region of the diffraction grating 006, and the unwanted beam spots formed are expressed with a suffix +1', and the −1st-order signal light beams obtained by the division, and the signal beam spots formed are expressed with a suffix −1'. Clearances from a central point O of the detector to central parts of the photo-receivers R1 and R2 are each defined as a photo-receiver distance β2. During reproduction from the information layer 019, the center of the photo-receiver or a region of dark lines is illuminated with a signal light beam, as shown in FIG. 11. This state is substantially the same as in FIG. 3. In contrast to this, unwanted beam spots I+1' and I−1' form large circular spots centrally on the photo-receivers R1 and R2, respectively, as shown in FIG. 11.

On the diffraction grating 006, the signal light beam has its outermost edge size reduced with an increase in an amount of out-of-focus light (the outermost edge here is equivalent to the broken-line circle 201 in FIG. 2). If a predetermined amount of out-of-focus light is exceeded, therefore, conditions under which all signal light beams are admitted into the region I of the diffraction grating 006 will occur. As described above, unwanted light beams are equivalent to the signal light beams that have increased in the amount of defocusing. The amount of defocusing increases with an increase in the space between the information layer being used for reproduction, and the information layer causing an unwanted light beam, so that if a predetermined space is exceeded, conditions under which all unwanted light beams also enter the region I of the diffraction grating 006 will occur. In the triple-layered disc 017, because of its maximum space being greater than that of the double-layered disc, the conditions under which all unwanted light beams enter the region I of the diffraction grating 006 will occur and as shown, large circular spots will be formed on the detector 007.

As described above, unwanted light beams will become disturbances if they enter the photo-receivers used for the generation of FES and TES. The photo-receiver distance β2, therefore, needs to be determined so that the unwanted beam spots I+1' and I−1' do not enter the photo-receivers used for the generation of FES and TES.

Figure 12:
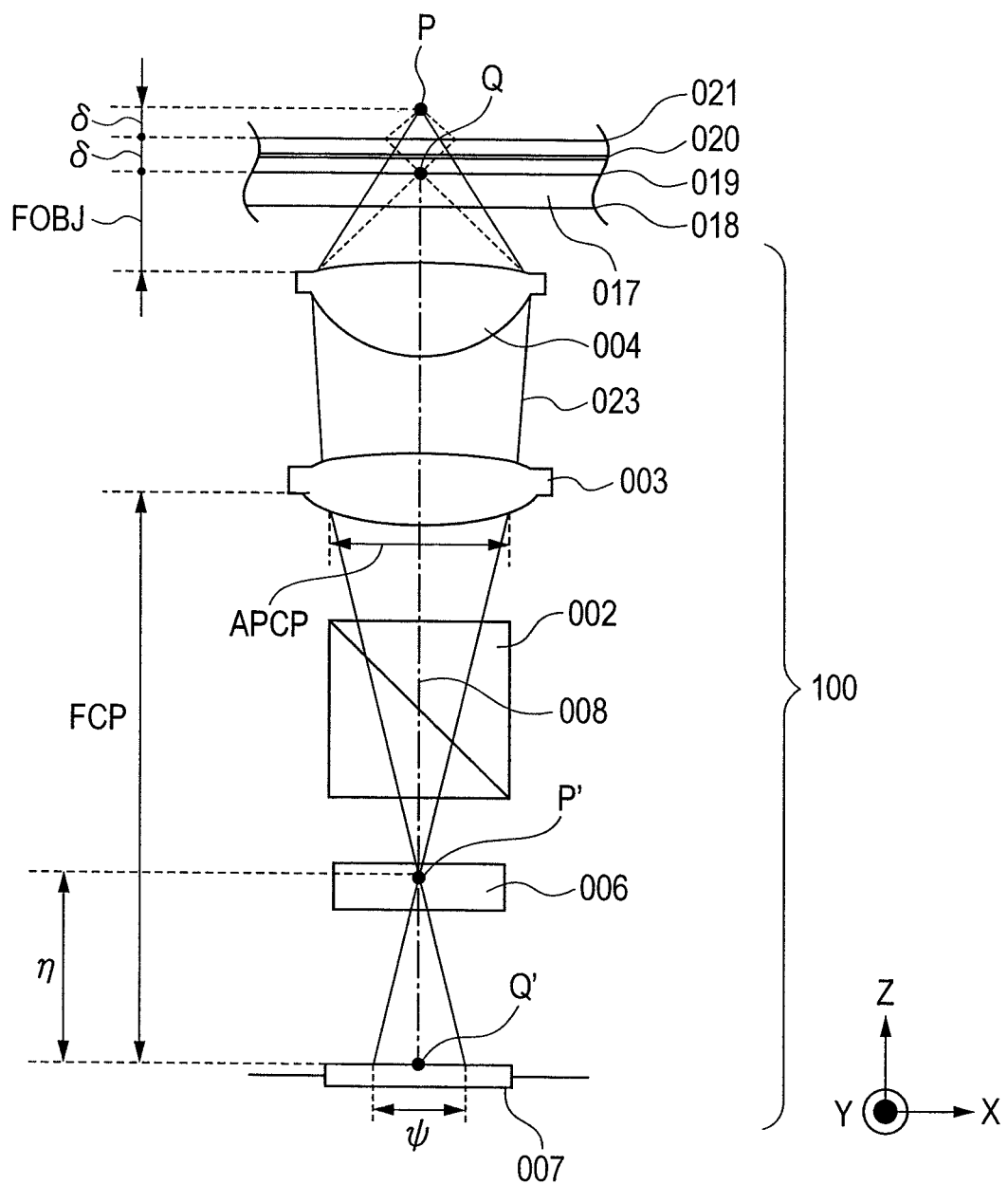
FIG. 12 is a schematic of an optical pickup existing when it is reproducing information from an information layer 019, the nearest of all information layers to the surface of the triple-layered disc 017, in the third embodiment.

FIG. 12 is a schematic that shows an outbound path of the optical pickup 100 existing when it is reproducing information from the information layer 019 of the triple-layered disc 017. The triple-layered disc 017 includes the surface 018 and the information layers 019, 020, 021. The space between the information layers 019 and 021 in FIG. 12 is the maximum space δ. Line 023 denotes an unwanted light beam reflected from the information layer 021 (no signal light beam is shown). The unwanted light beam is shown as a beam passed through, not divided by, the diffraction grating 006.

The unwanted light beam reflected from the information layer present at a position deeper from the surface than from the information layer being used for the reproduction can commonly be regarded as an optical beam occurring at a distance (virtual light-emitting point) twice as far as the space between the two information layers. This position is shown as the virtual light-emitting point P in FIG. 12. In other words, the virtual light-emitting point P is equivalent to a point twice as far as the maximum space δ, from the information layer 019.

The virtual light-emitting point P is offset from the information layer 019, in a plus Z-direction. This offset causes the unwanted light beam to be focused in the plus Z-direction with respect to the detector 007, resulting in the detector 007 being irradiated in a blurry condition as described above. The focusing point of this unwanted light beam is defined as the focusing point P' of the unwanted light beam on the outbound path, and a diameter of the unwanted beam spot which the unwanted light beam forms on the detector 007 is taken as the unwanted beam spot diameter ψ. Also, a clearance between the detector 007 and the focusing point P' of the unwanted light beam on the outbound path is expressed as the clearance η. Additionally, positions at which the signal light beam gets focused on the information layer 019 and on the detector 007 are taken as the signal light focusing point Q and the focusing point Q' of the signal light on the outbound path, respectively.

When the maximum space δ is zero, the signal light focusing point Q and the virtual light-emitting point P exist at the same position. Similarly, the focusing point P' of the unwanted light beam on the outbound path and the focusing point Q' of the signal light thereon exist at the same position. An increase in the maximum space δ increases the distances between the signal light focusing point Q and the virtual light-emitting point P, and between the focusing point P' of the unwanted light beam on the outbound path and the focusing point Q' of the signal light thereon. Likewise, the distance η also extends. For example, if the maximum space δ increases to roughly 50 μm, since the distance η becomes very long as shown, the conditions occur that cause the focusing point P' of the unwanted light beam on the outbound path to be positioned on the diffraction grating 006. Consequently, all unwanted light beams enter the region I thereof, and such a special, unwanted light beam as shown in FIG. 11 occurs. To use a triple-layered disc having a large maximum space δ, therefore, a need arises to avoid the occurrence of the special, unwanted light beam. It can be seen from FIG. 12 that similarity exists between a triangle formed by the focusing point P' of the unwanted light beam on the outbound path and the unwanted beam spot diameter ψ, and a triangle formed by the focusing point P' of the unwanted light beam and an effective diameter (APCP) of the unwanted light beam entering the collimating lens. Hence, the following relationship exists between the unwanted beam spot diameter ψ, a focal length (FCP) of the collimating lens 003, APCP, and the clearance η:

$$\psi: APCP = \eta : (FCP - \eta) \quad (20)$$

In addition, the clearance η and the distance twice the maximum space δ are in a relationship of an optical, longitudinal magnification, and this relationship is therefore expressed as follows using the optical magnification M:

$$\eta = M^2 \times 2 \times (\delta/n) \quad (21)$$

where "n" denotes a refractive index of the triple-layered disc. The clearance (δ/n) expressed in terms of the refractive index "n" is used since the maximum space 6 exists in the triple-layered disc. Since BDs commonly have a refractive index "n" of 1.62, the present embodiment also assumes that the refractive index "n" of the triple-layered disc 017 is 1.62.

Nearly parallel optical beams travel between the collimating lens 003 and the objective lens 004, so an effective diameter (APOBJ) of the optical beams entering the objective lens 004 can be regarded as equal to APCP, such that substituting expressions (11), (12), (21) to expression (20) yields expression (22).

$$\psi = 2 \times NAOBJ \times M \times (2\delta/n) \quad (22)$$

It can be seen from expression (22) that since the unwanted beam spot diameter ψ is proportional to the optical magnification M and the maximum space δ, when the optical magnification reaches a maximum of 13 times and the maximum space δ becomes 60 μm, the unwanted beam spot diameter ψ is maximized in the assumed optical magnification-M range.

Accordingly, substituting optical magnification M=13 times, space δ=60 μm, and NAOBJ=0.85, and refractive index "n"=1.62 to expression (22) provides a maximum unwanted beam spot diameter ψ of 1,637 μm.

As described above, the unwanted beam spot diameter ψ is equivalent to a diameter of the unwanted beam spots I+1' and I−1'. If the diameter of the unwanted beam spots is 1,637 μm, when the photo-receiver distance β2 is set to be at least 818 μm, half of the unwanted beam spot diameter, the unwanted beam spots I+1' and I−1' do not overlap each other on the detector. Instead, the unwanted beam spots I+1' and I−1' move away from each other, which then prevents the formation of the unwanted beam spots I+1' and I−1' on the photo-receivers for FES/TES generation.

That is, assigning a value of at least 818 μm as the photo-receiver distance β2 of the detector 007 prevents the formation of the unwanted beam spots I+1' and I−1' on the photo-receivers for FES/TES generation.

When information is reproduced from the information layers 020 and 021, the space of these information layers that is equivalent to the maximum space δ is some 25 μm, so the unwanted light beam reflected from the information layer not being used for the reproduction will look as shown in FIG. 4 or 5, and will not enter the photo-receivers for FES/TES generation.

As described above, during reproduction from the triple-layered disc having a space of 25 μm, the optical pickup of the third embodiment prevents unwanted light beams from entering the photo-receivers for FES/TES generation. Therefore, noiseless FES and TES can be obtained, which enables stable focus control and tracking control.

The above optical pickup is also constructed to implement reproduction from, for example, a triple-layered disc with a 12.5 μm information layer-to-layer space, formed by inserting a third information layer between the information layers of a double-layered disc. During reproduction from a triple-layered disc having a 12.5 μm information layer-to-layer space, since the maximum space δ becomes 25 μm, unwanted beam spots will look as in FIG. 4 or 5, irrespective of which of the information layers is being accessed for the reproduction. The optical pickup is constructed to prevent these unwanted beam spots from being formed on the FES/TES-related photo-receivers, as described in the first embodiment, so the optical pickup can also reproduce information from triple-layered discs having a 12.5 μm information layer-to-layer space.

In addition, the optical pickup can reproduce information from quadruple-layered discs having, for example, 25 μm, 12.5 μm, 12.5 μm pitched information layer-to-layer spaces. Quadruple-layered discs have a maximum space of 50 μm, and reproduction from these quadruple-layered discs can be achieved because the optical pickup is constructed to prevent unwanted beams from entering the photo-receivers for FES/TES generation.

Briefly, if the maximum space is 60 μm or less with tolerances taken into account, the optical pickup of the first embodiment generates noiseless FES and TES, even when the pickup reproduces information from three-layered, four-layered, or more-layered discs, and provide focus control and tracking control stably. Additionally, even if the maximum space exceeds 60 μm, the above relationships make avoidable the unwanted light beams stemming from an information layer other than that to be used for information reproduction.

A triple-layered disc with information layers pitched at an equal space has been described for simplicity's sake, but actual information layers are normally arranged with different spaces. It is desirable, therefore, that differences be made in space between the information layers in the maximum space–δ range of 60 μm, and the present optical pickup can, of course, reproduce information similarly to the above, even if the triple-layered disc has those different spaces.

In addition, although the optical pickup of the first embodiment has been used to describe a triple-layered disc, determining the photo-receiver distance β2 similarly to the above makes the optical pickup of the second embodiment obviously applicable to triple-layered discs as well.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical pickup that reproduces information from an optical disc having at least two information layers, the optical pickup comprising:
   a light source that emits an optical beam;
   an objective lens that converges the optical beam upon a predetermined information layer from which desired information is to be reproduced in the optical disc;
   a diffraction grating that divides the optical beam reflected from the predetermined information layer of the optical disc that is to be used for the reproduction, into a plurality of optical beams according to region of the optical beam; and
   a detector that includes a plurality of photo-receivers for receiving the plurality of optical beams; wherein:
   the detector includes, as the plurality of photo-receivers, a plurality of photo-receivers for generating a tracking control signal, a focusing control signal, and a reproduction signal; and plus/minus-first-order optical beams obtained by division in any region of the diffraction grating, and second-order and higher-order optical beams obtained by division in other regions are arranged at different positions on the detector.

2. The optical pickup according to claim 1, wherein:
the detector is disposed at a position where is converged an optical beam that has not been divided by and has passed through the diffraction grating; and wherein, if the position at which the optical beam passed through the diffraction grating is defined as a central section of the detector, the optical beam reflected from the predetermined information layer of the optical disc that is to be used for the reproduction is defined as a signal light beam, and the optical beams reflected from the other information layers of the optical disc are defined as unwanted light beams:
the diffraction grating includes a predetermined region to divide from the signal light beam a region including at least a central portion of a spot which the signal light beam will form on the diffraction grating;
the detector includes a spot center photo-receiver to receive the optical beam divided in the predetermined region of the diffraction grating; and
a distance from a central portion of the spot center photo-receiver to that of the detector is equal to or greater than a spot radius of the unwanted light beams on the detector that have been admitted into the predetermined region of the diffraction grating.

3. The optical pickup according to claim 1, wherein:
if a position where an optical beam is converged that has not been divided by and has passed through the diffraction grating is defined as a central section of the detector, and
if a vector connecting the central section of the detector and the photo-receiver is defined as a direction vector,
the photo-receivers arranged outside the detector in order to generate the tracking control signal and the reproduction signal have a shape longer in a direction parallel to the direction vector, than in a direction vertical thereto.

4. The optical pickup according to claim 3, wherein:
the photo-receivers for generating the tracking control signal and the reproduction signal have a shape that includes at least a square region measuring at least 24 μm per side.

5. The optical pickup according to claim 3, wherein:
the spot center photo-receiver is disposed at a distance of at least 818 μm from the central section of the detector.

6. The optical pickup according to claim 1, wherein:
the diffraction grating divides the optical beam reflected from the predetermined information layer of the optical disc, into at least a region including a central portion of a spot which the optical beam will form on the diffraction grating, and a region for detecting a push-pull signal obtained from the optical beam reflected from the optical disc.

7. The optical pickup according to claim 1, wherein:
the detector includes at least four photo-receivers;
the detector is disposed at a position where is converged an optical beam that has not been divided by and has passed through the diffraction grating;
the four photo-receivers are arranged in order on a predetermined line heading outward from the central section of the detector; and
if the position at which the optical beam passed through the diffraction grating is defined as a central section of the detector, and a distance from the central section of the detector to a central portion of the photo-receiver of the four photo-receivers that is closest to the central section of the detector is defined as a center-to-center distance,
a distance from the central section of the detector to a light-receiving region of the photo-receiver of the four photo-receivers that is farthest from the central section of the detector is equal to or less than twice the center-to-center distance.

8. The optical pickup according to claim 7, wherein:
the center-to-center distance is at least 84 μm.

9. The optical pickup according to claim 1, wherein:
the diffraction grating divides the optical beam reflected from the predetermined information layer of the optical disc, into at least a region including a central portion of a spot which the optical beam will form on the diffraction grating, and a region for detecting a push-pull signal obtained from the optical beam reflected from the optical disc.

10. The optical pickup according to claim 9, wherein:
the detector is disposed at a position where is converged an optical beam that has not been divided by and has passed through the diffraction grating; and wherein, if the position at which the optical beam passed through the diffraction grating is defined as a central section of the detector, the optical beam reflected from the predetermined information layer of the optical disc that is to be used for the reproduction is defined as a signal light beam, and the optical beams reflected from the other information layers are defined as unwanted light beams:
the diffraction grating includes a predetermined region to divide from the signal light beam a region including at least a central portion of a spot which the signal light beam will form on the diffraction grating;
the detector includes a spot center photo-receiver to receive the optical beam divided in the predetermined region of the diffraction grating; and
a distance from a central portion of the spot center photo-receiver to that of the detector is equal to or greater than a spot radius of the unwanted light beams on the detector that have been admitted into the predetermined region of the diffraction grating.

11. The optical pickup according to claim 10, wherein:
if a vector connecting the central section of the detector and the photo-receiver is defined as a direction vector,
the photo-receivers arranged outside the detector in order to generate the tracking control signal and the reproduction signal have a shape longer in a direction parallel to the direction vector, than in a direction vertical thereto.

12. The optical pickup according to claim 11, wherein:
the photo-receivers for generating the tracking control signal and the reproduction signal have a shape that includes at least a square region measuring at least 24 μm per side.

13. The optical pickup according to claim 12, wherein:
the spot center photo-receiver is disposed at a distance of at least 818 μm from the central section of the detector.

14. The optical pickup according to claim 13, wherein:
the detector includes at least four photo-receivers;
the four photo-receivers are arranged in order on a predetermined line heading outward from the central section of the detector; and
if a distance from the central section of the detector to a central portion of the photo-receiver of the four photo-receivers that is closest to the central section of the detector is defined as a center-to-center distance,
a distance from the central section of the detector to a light-receiving region of the photo-receiver of the four photo-receivers that is farthest from the central section of the detector is equal to or less than twice the center-to-center distance.

15. The optical pickup according to claim 14, wherein:
the center-to-center distance is at least 84 μm.

16. The optical pickup according to claim 1, wherein higher-order optical beams obtained by division in other regions are arranged at different positions on the detector and do not enter a photo-receiver of the plurality of photo-receivers of the detector.

* * * * *